TREATMENT AND DISPOSAL OF WASTE SLUDGES

Original Filed July 10, 1961

INVENTORS:

ORRIS E. ALBERTSON
WILLIAM F. BUDD
By: Theodore M. Jablon
Att'y

TREATMENT AND DISPOSAL OF WASTE SLUDGES

Original Filed July 10, 1961

INVENTORS:
ORRIS E. ALBERTSON
WILLIAM E. BUDD
By: Theodore R. Jablon
Att'y

TREATMENT AND DISPOSAL OF WASTE SLUDGES

Original Filed July 10. 1961

INVENTORS:
ORRIS E. ALBERTSON
WILLIAM E. BUDD
By: Theodore M. Jablon
Att'y

INVENTORS:
ORRIS E ALBERTSON
WILLIAM E. BUDD
BY Theodore M. Jablon
ATT'Y

TREATMENT AND DISPOSAL OF WASTE SLUDGES

Original Filed July 10, 1961

INVENTORS:
ORRIS E. ALBERTSON
WILLIAM E. BUDD
By: Theodore M. Jablon
Att'y

TREATMENT AND DISPOSAL OF WASTE SLUDGES

Original Filed July 10, 1961

INVENTORS:
ORRIS E. ALBERTSON
WILLIAM E. BUDD
By Theodore M. Jablon
Att'y

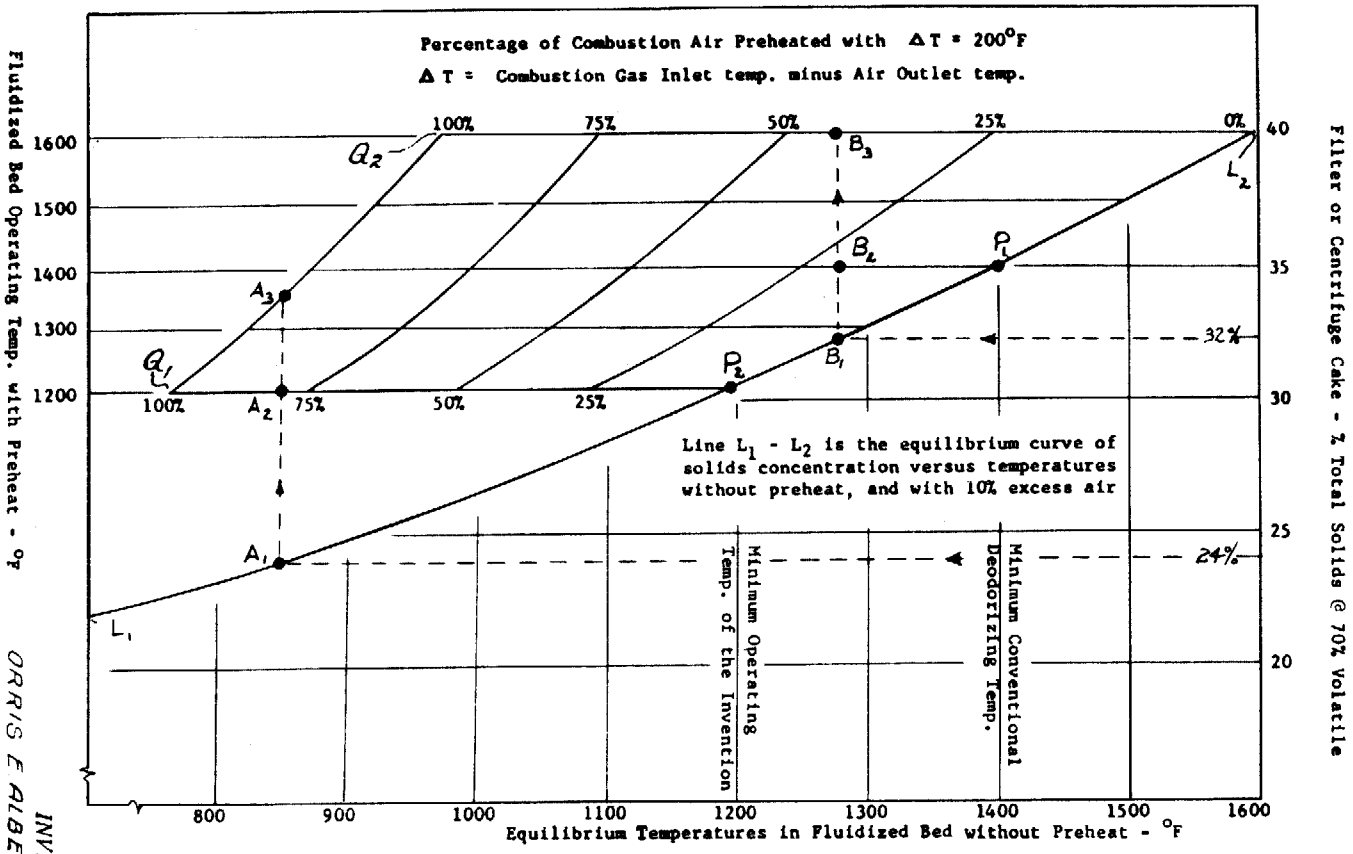
Fig. 7 REPRESENTS THE PERCENTAGE OF PREHEATED AIR REQUIRED TO MAINTAIN 1200° to 1600° F IN FLUIDIZED BED
INVENTORS:
ORRIS E ALBERTSON
WILLIAM E BUDD
By: Theodore M. Jablon
Att'y.

United States Patent Office

Re. 26,514
Reissued Dec. 31, 1968

26,514
TREATMENT AND DISPOSAL OF WASTE SLUDGES

Orris E. Albertson, Norwalk, and William E. Budd, Ridgefield, Conn., assignors to Door-Oliver Incorporated, Stamford, Conn., a corporation of Delaware Original No. 3,319,586, dated May 16, 1967, Ser. No. 131,455, July 10, 1961. Application for reissue Aug. 18, 1967, Ser. No. 663,463
19 Claims. (Cl. 110—8)

Matter enclosed in heavy brackets [ ] appears in the original patent but forms no part of this reissue specification; matter printed in italics indicates the additions made by reissue.

This invention relates to improvements in the disposition of sewage sludges or the like, and more particularly to improvements pertaining to the destruction of the organic sludge solids by complete combustion.

The invention is concerned with the disposal of high moisture waste having waste solids which contain as a major portion thereof combustible organic waste matter, the balance comprising ash material and inert solids entrapped in said high moisture waste.

For example, in prior sewage sludge incineration systems it was necessary to have a partially dewatered raw sludge, such as filter cake having a solids concentration of about 25% to 35%, subjected to further conditioning treatment for the purpose of producing the sludge solids as a specially dried powder-like substance of about 90% to 95% solids concentration, in order to ensure complete combustion. This operation requires that the considerable amount of excess heat in the combustion gases liberated by the incineration of this relatively dry sludge material be used to dry the filter cake to the concentrations noted above. However, the resulting spent drying gases become odorous and quite moist, and they in turn make it necessary to provide a further auxiliary treatment compartment where these gases are heated to about 1250°–1400° F. to oxidize the odorous matter in order that inoffensive gases may be released into the atmosphere.

Therefore, in prior incineration systems a considerable amount of conditioning equipment is required, comprising, for example a mixer for premixing dried and moist sludge solids, heating equipment for gas-drying the mixture, means for re-heating the spent drying gases for deodorization, as well as gas-solids separating equipment such as cyclones or the like for separating the sludge solids from the drying gases for combustion in a powdered fuel burner.

The invention aims to provide a greatly simplified method and an apparatus system for direct combustion of partially dewatered or moist sludge, which eliminates the need for the above or similar preparatory operations and equipment in particular the separate drying operation and its accessories, along with the expenditures for extra fuel, power, and required maintenance. Yet the invention will produce odor-free inoffensive combustion gases directly from the combustion of the moist sludge at combustion temperatures readily and accurately controllable so as to be high enough to avoid offensive odors.

More particularly therefore, the invention is concerned with providing a combustion unit extremely simple and compact in arrangement and construction, as well as extremely simple to operate and control, to the end of attaining complete and odorless combustion directly of the moist sludge. Moreover, the combustion unit for that purpose should possess high thermal efficiency as well as operational economy without requiring any moving parts exposed to combustion temperatures.

This invention further aims to provide such a combustion unit that can be brought up quickly to operating temperature from a cold start, or can be re-started quickly, for example, where periods of combustion alternate with shutdown periods in a daily operating schedule.

The foregoing objects are attained, according to the invention, by effecting the combustion of the moist raw sludge in a bed of inert hot granular material maintained in a state of fluidization which is the formation of a dense and turbulent suspension of particles in an upflowing stream of treatment gas termed a turbulent layer or fluidized bed. Combustion thus conducted under the conditions of the invention will reduce the organic solids in the sludge to stable gaseous products, with a large portion of the heat liberated by the combustion of the sludge fuel used to flash off the moisture in the sludge while also heating the combustion gases to the bed temperatures ensuring complete odorless combustion.

More particularly, the invention provides a method as well as apparatus whereby a concentrated sludge, for example in the aforementioned range of 25% to 35% solids concentration, is fed directly into a combustion chamber where, in the presence of the suspended inert particles of hot inert auxiliary material, a complete and odorless combustion is maintainable and readily controllable so that the combustion gases will be kept odor-free. To that end, the invention provides a combustion chamber wherein a quantity of inert granular material having high heat storage—as well as high heat-radiating capability, for example graded sand, is maintained in a heated fluidized state.

This fluidized bed of inert particles is maintained in an upflowing stream of combustion air supplied through a constriction plate or the like at the bottom of the bed, the fluidized air thus providing the oxygen required for the combustion of the moist sludge solids that are continuously fed into the turbulence of this bed where they are subjected to rapid intermingling with the hot fluidized sand. In this way, complete as well as odorless combustion is achieved by this invention directly in the presence of the heat storing and heat radiating sand particles, with the air combustion proceeding at a high speed.

While hot auxiliary combustion gases may be employed as the fluidizing medium initially to bring the suspended inert particles up to operating temperature, according to the invention, the sludge solids subsequently supplied at filter cake moisture and at a suitable rate, will thereafter, sustain their own complete and odorless combustion in the presence of the heat radiating suspended sand.

In this invention, it was found that with such rapid dispersal of the sewage solids even though in a moist condition, throughout the fluidized bed of hot sand particles, the usual localized cooling or quenching effect due to the moisture content was avoided, establishing a thermally homogeneous condition of sufficiently high temperature to effect rapid odor-free combustion directly in the fluidized bed.

Furthermore, during shutdown periods, a sufficient reservoir of heat is retained by the walls of the unit and by the mass of hot subsided inert particles, enabling the combustion operation to be resumed directly without delay or further preparation, and without the use of any auxiliary fuel, following such interruption. This heat reservoir also provides a cushion which absorbs fluctuations due to changes in the character of the feed sludge supply entering the fluidized bed.

The invention further comprises operating controls which may be automatic, whereby efficient and complete as well as odorless combustion is assured in spite of fluctuations in the volatile combustible solids loading rate or in the moisture content of the dewatered sludge. The invention, therefore, provides controls for regulating the volatile solids/air ratio in response to such feed changes, as well as controls for regulating the combustion temperature, both controls jointly effective to satisfy the requirements for complete as well as odorless combustion.

According to one feature of the invention, stack gas analysis may be employed to regulate combustion air in relation to the rate of feed sludge supply to attain complete combustion, while temperature indication from the fluidized bed may be utilized for regulating the preheating of the combustion air by the combustion gases to the extent required for maintaining the temperature high enough to ensure odorless combustion.

According to still another feature, a portion of the heat of the combustion gases is utilized for preheating thickened sludge in order to facilitate and improve the dewatering operation, benefitting the subsequent combustion operation in the fluidized bed.

Some of the embodiments of the invention concern arrangements whereby prepared mixtures of raw primary sludge and aerobically treated secondary sludge are subjected to the above kind of combustion operation.

Other features and advantages will hereinafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

In the accompanying drawings:

FIG. 7 is a graph serving as an illustration of the combustion operation.

Figure 5:
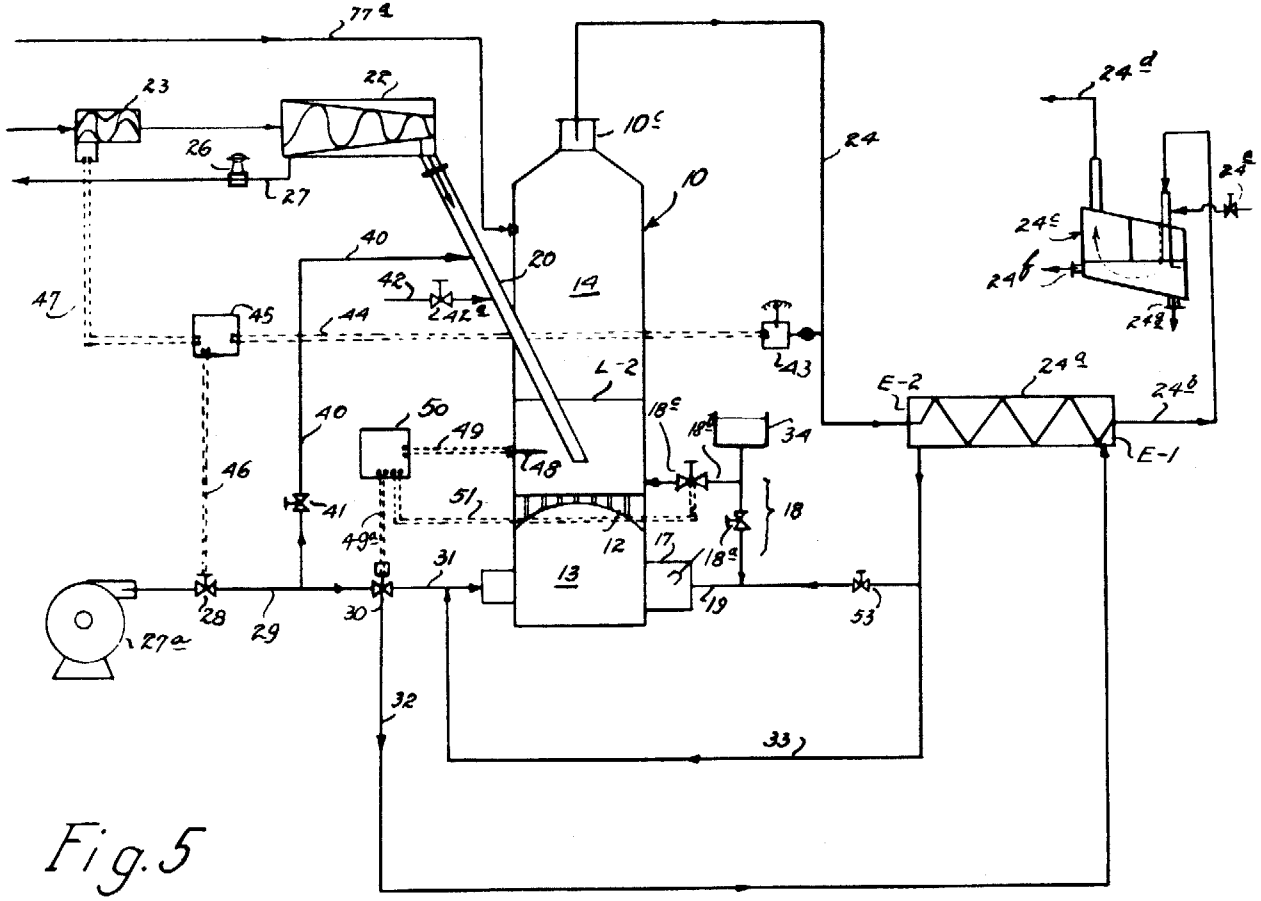
FIG. 5 shows a portion of the flowsheet common to FIGS. 1, 2, and 3, somewhat enlarged, illustrating automatic combustion control.
Figure 6:
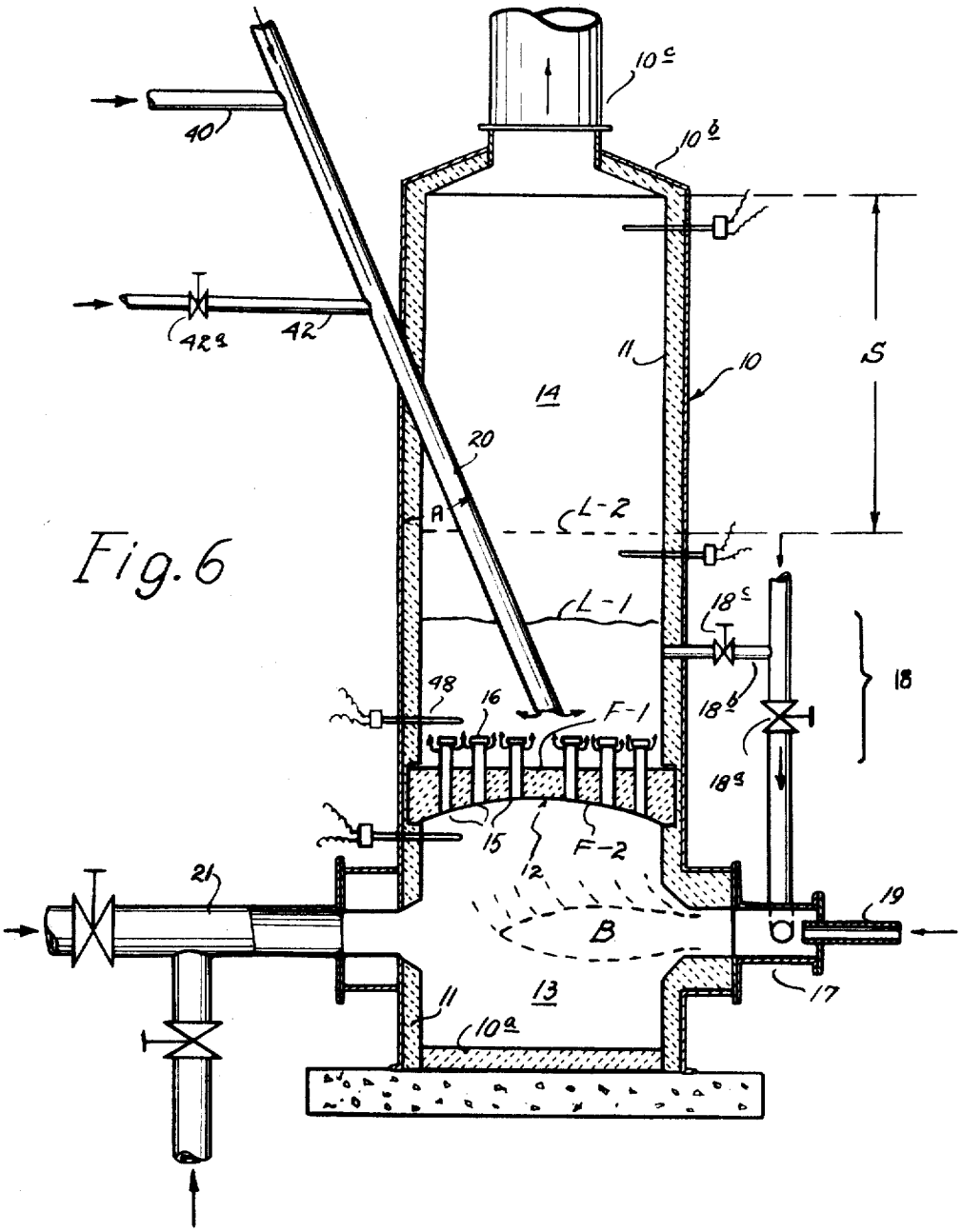
FIG. 6 shows a greatly enlarged vertical section of an example of the combustion unit, containing the bed of fluidized materials.

By way of example, reference may first be had to the semi-diagrammatic showing in FIG. 6 of a combustion unit suited for practicing the combustion step of this invention, in view of the discovery that the complete and odor-free combustion of moist organic sludge solids is attainable directly in a fluidized bed operated under the combustion conditions specified by this invention. Next, reference may be had to the diagrammatic FIG. 5 illustrating the operation of the combustion unit of FIG. 6 more particularly with respect to the control of the combustion operation which is preferably automatic, and in connection with apparatus units directly associated with the combustion unit and with the controls, and including a controlled preheating arrangement for the combustion air.

The combustion unit itself according to the example in FIG. 6 is in the nature of a cylindrical steel vessel or vertical shell 10 which has a flat bottom 10a and a conical top 10b provided with a stack connection 10c, the whole vessel being provided with a lining of suitable refractory material 11. A constriction plate 12 preferably of suitable refractory material divides the vessel or tower into a wind box 13 below to which fluidizing gases are supplied, and a combustion chamber 14 above the constriction plate for the combustion to be carried out therein of the aforementioned moist organic sludge. The constriction plate may be of monolithic refractory construction or it may be composed of shaped refractory bricks constituting a self-sustaining arch construction defined by a horizontal face F–1 at the top and a concave bottom surface F–2. Holes 15 are regularly spaced in the constriction plate to insure an even distribution of the fluidizing gas or combustion air from the wind box over the entire cross section of the combustion chamber. Bubble cap devices 16 associated with respective passages 15 in the constriction plate prevent the escape of any solids from the combustion chamber down through the constriction plate.

For the purposes of this invention, the combustion chamber contains a more or less permanent charge or body of an auxiliary inert granular material having heat storing—and heat radiating capability. Sand, for example, may be employed for this purpose graded to suit the present fluidizing operation in accordance with the requirements of the invention further to be explained below. L–1 designates the level of this body of inert material when subsided and the sand particles are at rest, whereas L–2 designates the bed or bed level with free board space S above, when this body of material is expanded or in a fluidized state due to the effect of fluidizing gases or combustion air forced upwardly from the wind box through the constriction plate.

The wind box has an auxiliary fuel burner 17 which may be operated for starting up the sludge combustion operation.

With the air of this burner the inert granular material of sand is first brought up to a required operating temperature, auxiliary fuel being supplied from pipe 18 via control valve 18a to the burner which also has a pipe 19 for supplying the combustion air. Thus, preparatory to the sludge combustion proper, the wind box itself becomes initially a combustion chamber as indicated by the burner flame B, with sufficient pressure maintained within the wind box to force the resulting hot combustion gases through the constriction plate and through the bubble cap devices, to maintain the sand as an expanded fluidized bed while heating the same to the desired temperature, with spent heating and fluidizing gases escaping through the stack. In case of need, auxiliary fuel may be injected directly into the fluidized bed, as indicated by the branch pipe 18b provided with control valve 18c.

Once the bed of fluidized inert material has reached the desired operating temperature, the supply of prepared moist sludge into the bed of hot turbulent sand particles may be started through a sludge supply pipe 20 preferably arranged so as to intersect terminating in the region of the bottom strata of the bed. In the case of larger units however, a plurality of such supply pipes may be arranged in spaced relationship with one another around the vertical axis of the unit.

The sludge thus provided in a suitable moisture range at less than 50% total solids concentration will intermingle rapidly with the hot turbulent sand particles substantially uniformly throughout the volume of the fluidized bed.

The temperature of the body of hot inert fluidized material is maintained sufficiently high for attaining complete and odorless combustion of the organic solids in the combustion chamber.

The term "combustion gases" as used herein is defined as all gaseous product resulting from the combustion of the wet sludge. These gases therefore will include $CO_2$, $Na_2$, $O_2$ and water vapor along with minor concentrations of other inert gases. The water vapor contained in these gases will result from the burning of hydrogen in the sludge and the entrained moisture in the sludge. It is this total combustion gas volume that is used for determining the gas flow volume or "space rate" required for maintaining the fluidized condition of the particles.

As a result of this invention, complete combustion is maintainable for example with the sludges prepared to have a total solids content in the range of about 23% to about 40% at combustion temperatures and preferably in a range from about 1200° F. to about 1600° F., providing non-obnoxious combustion gases.

To this end, the sludge/combustion air ratio control ensures complete combustion of the oxidizable moist organic matter, while preheating of the combustion air by the combustion gases in proportion to the moisture content of the sludge maintains combustion temperatures adequate for complete non-odorous combustion.

Control of the sludge/air ratio can be achieved in this invention, preferably automatically, by means of a stack gas analyzer capable of indicating currently the excess oxygen appearing in the combustion gases. These indications, being a criterion of any changes in the sludge/air ratio, may be utilized for monitoring the rate of air supply while maintaining a constant rate of feed sludge supply volumetrically, or vice versa maintaining a constant rate of air supply while regulating the rate of feed sludge supplied by the pump. In this way, the supply of combustion air is maintained adequate to attain complete combustion, but not so great as to unduly lower the combustion temperature and the general combustion efficiency. Complete and odorless combustion of the organic solids in the waste is attainable in the practice of this invention with an air excess of less than 50%, a practical range being from about 10% to about 30%.

The combustion temperature, according to one embodiment in the controls of this invention, is maintained by a thermo-couple extending into the fluidized bed to provide temperature indications that may be utilized for diverting correspondingly varying portions of the combustion air supply through a heat exchanger with hot combustion gases passing counter-currently therethrough.

Thus, these controls will operate to cause all of the combustion air to bypass the heat exchanger whenever the solids concentration is correspondingly high in which case no air preheating will occur at all. But, when the solids concentration falls to a particularly low level, then in addition to effecting preheating of all of the combustion air, the controls may work to cause auxiliary fuel to be injected into the fluidized bed, that is, during a period of high moisture sludge supply.

Combustion controls to satisfy the foregoing requirements of sludge/air ratio and combustion temperature, are exemplified diagrammatically in the apparatus arrangement or combustion system illustrated in FIG. 5. Accordingly, the combustion unit 10 has the sludge supply pipe 20 leading for example from a dewatering device such as a solid bowl type centrifuge 22 (to be furthermore described below) delivering feed sludge of suitable moisture content or organic solids concentration into the hot fluidized bed of sand maintained in the combustion chamber. A metering pump 23, for instance of the Moyno type, provides a continuous uniform volume of sludge into the centrifuge at say 5% to 12% total solids concentration to be further increased in the operation of the centrifuge to a range substantially of the aforementioned 23% to 40%. The pump then acts as a sealing device capable of delivering an adjusted or metered volume of sludge against a pressure maintained in the closed housing of the centrifuge, which in turn communicates with the combustion chamber through the inclined supply pipe 20, with adequate pressure being maintained in the combustion unit at least sufficient to offset any subsequent pressure drop encountered by the combustion gases passing through a flue duct or pipe 24 to the preheater 24a and from there through a pipe 24b to a dust or ash scrubber 24c, then to be released into the atmosphere at 24b. Scrubbing water supply for this unit is indicated at 24e while an overflow and ash discharge means are indicated at 24f and 24g respectively.

Figure 3:
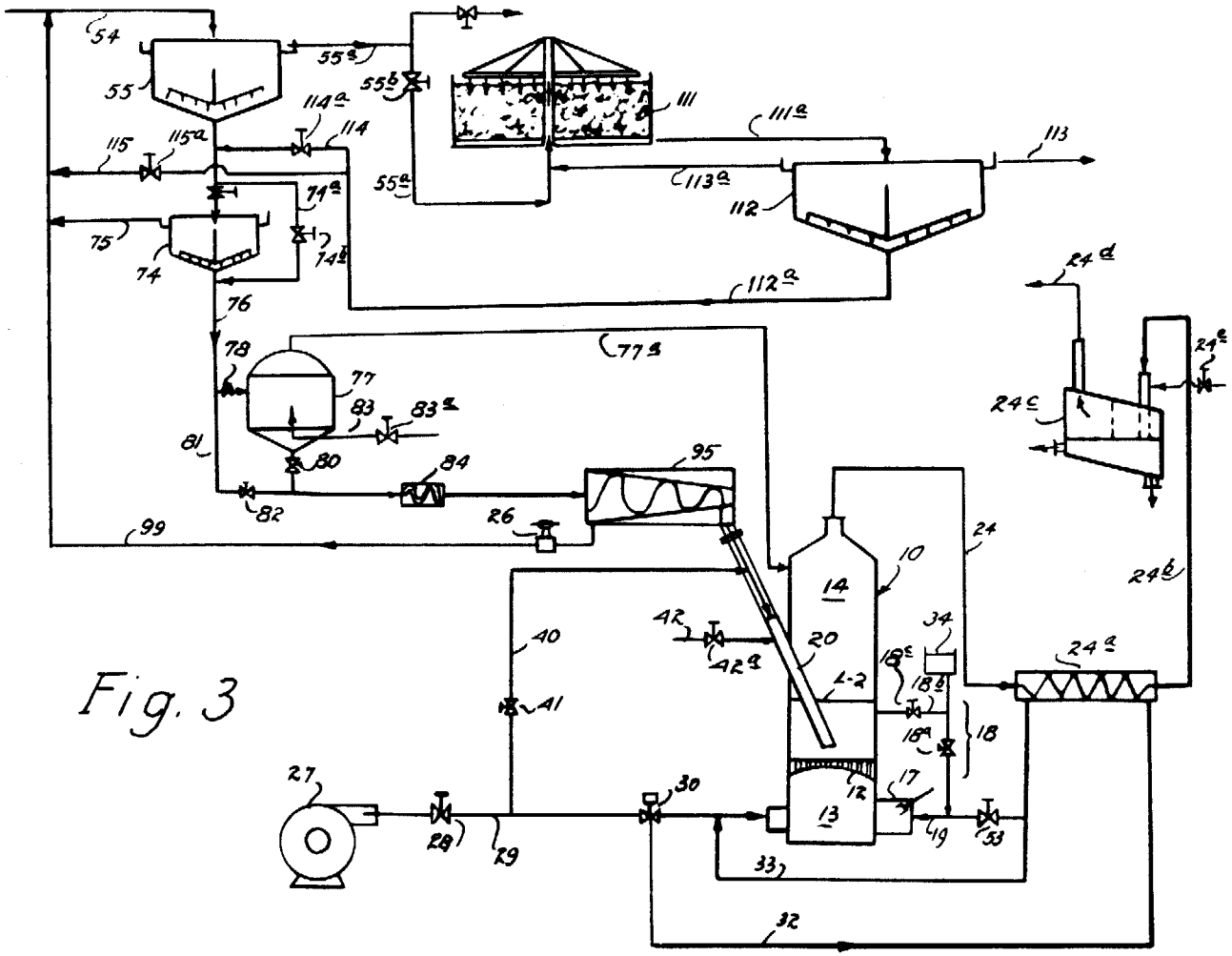
FIG. 3 is still another complete treatment flowsheet modifying the flowsheet of FIG. 1, by employing a trickling filter and a centrifuge.
Figure 4:
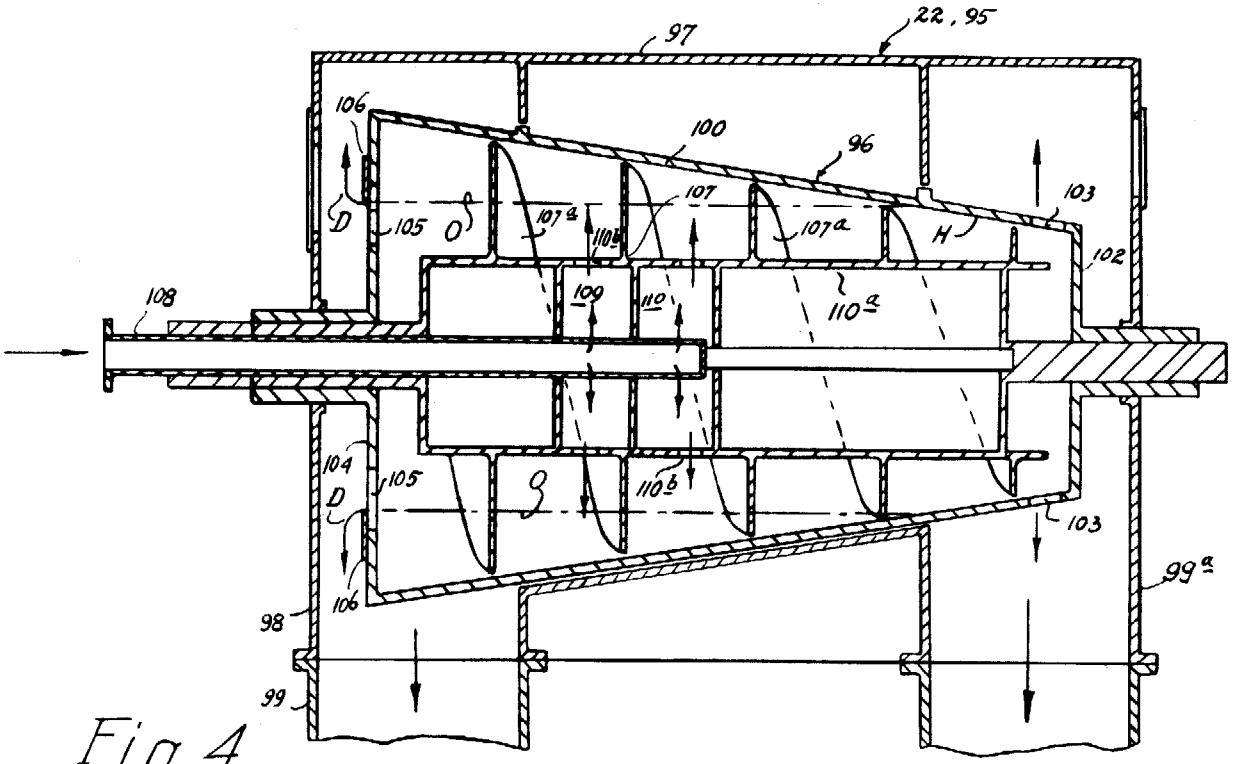
FIG. 4 illustrates diagrammatically the type of centrifugal machine employed for sludge concentration in the flow sheets of FIGS. 2 and 3.

A semi-diagrammatic example of the centrifugal machine enclosed and constructed for the aforementioned pressure operation is shown in FIG. 4 to be further described in more detail in connection with its embodiment in treatment systems shown in FIGS. 2 and 3 embodying the above described combustion phase of the invention. Because of the internal pressure to be maintained in this centrifugal machine, the separated liquid fraction discharges into the atmosphere by way of a suitable differential pressure valve 26 provided in the respective discharge line 27 (see FIG. 5) of the centrifuge.

A low pressure blower 27a provides the combustion air for the operation of the fluidized bed, having a main discharge control valve 28 provided in the supply line 29 leading from the blower to a proportional three-way valve 30 which has one delivery branch 31 leading to the wind box 13 of the combustion unit and another delivery branch 32 leading to the end E–1 of gas-to-gas type heat exchanger 24a which in turn has a discharge pipe at the opposite end E-2 for carrying the preheated combustion air to join and mix with the non-heated portion of the combustion air in the aforementioned branch pipe 31. Thus, in accordance with the setting of the proportional three-way valve 30, only a portion of the combustion air from the blower is delivered directly through branch 31 into the wind box 13, while the balance is diverted through branch 32, the preheater 24 and pipe 33, to mix with the unpreheated portion of the combustion air.

Under practical conditions, assuming an average stack gas temperature of about 1400° F. at the inlet end of the heat exchanger, and a discharge gas temperature of about 900° F. at the outlet end, adequate air preheating for the purpose of this invention is attainable with an average temperature differential of about 200° F. between the two gaseous media passing counter-currently therethrough.

However, with only about one third of the heat contained in the combustion gases thus utilizable by the gas-to-gas heat transfer in the heat exchanger, according to the invention a substantial portion of the then residual heat of the gases may still be utilized by way of a liquid-to-liquid heat transfer arrangement operating in a next lower suitable temperature range, involving the use of a stack gas scrubber and the preheating of sludge by the hot scrubbing water for aiding in the concentration of the sludge as will be furthermore explained.

In case of need, auxiliary fuel of either the liquid or the gaseous type may be admitted from the container or supply station 34 through pipes 18 and 18b via control valve 18c directly into the fluidized bed, to help sustain the combustion. For start-up purposes, control valve 18a may admit such fuel to the auxiliary burner 17, with combustion air preferably preheated by the combustion gases for shortening the starting period and to minimize the amount of start-up fuel needed.

The sludge supply pipe 20 has carrier air supplied thereto through branch pipe 40 leading from the blower and provided with control valve 41. A separate high presure purge air connection 42 with control valve 42a is provided to relieve clogging in the pipe.

Control of the combustion operation for the purposes of this invention is attainable manually or semi-automatically, or it may be fully automatic.

In case of full-automatic operation as herein illustrated, a gas analyzer 43 may be connected to the flue or stack gas conduit 24 to monitor and to initiate the control of the sludge/air ratio by furnishing current indications of the $O_2$-content of the combustion gases thus providing a criterion of the completeness and efficiency of the combustion. These $O_2$ indications from the gas analyzer may be relayed electrically as indicated by dotted line control connections 44 to a first control station 45 which in turn translates them into corresponding control operations regulating either the main air supply valve 28 as indicated by dotted line control connections 46 while holding the sludge supply from the pump 23 at a constant rate, or vice versa regulating the sludge supply by adjustment of the metering pump 23 as indicated by the dotted line control connections 47 while holding the air supply from the blower at a constant rate. These modes of controlling the sludge/air ratio may be employed either individually or jointly to ensure complete combustion of the oxidizable organic matter in the sludge. In this way, any changes in the volatile solids content in the sludge, that is the solids concentration, is compensated for, so that complete combustion is ensured and may be carried out with a predetermined practical minimum of air consumption.

However, in order to ensure that the combustion gases be inoffensive and non-odorous, monitoring and control of the combustion temperature must proceed simultaneously with and complementary to the above described sludge/air ratio control. Therefore, temperature control is initiated in this example by a thermo-couple 48 extending into the combustion chamber, the temperature responses of which are transmitted electrically as indicated by dotted line control connections 49 to a second control station 50 which in turn converts them into corresponding control effects with respect to setting the proportional three-way valve 30 thereby regulating that proportion of the combustion air from the main supply valve 28 that is diverted through pipe 32 to be preheated by the combustion gases in the heat exchanger 24a.

The operation of the second control station 50 for monitoring the combustion temperature is adjusted in such a manner that the temperature will not be allowed normally to fall below a predetermined minimum, being held to a suitable average value of, say, 1400° F. In the case of various moist sewage sludges a practical temperature range is from about 1200° to about 1600° F., since that will ensure non-odorous combustion while minimizing wear and tear on the refractory lining of the combustion unit. Under these conditions, if the solids concentration of sludge entering the combustion chamber is sufficiently high, the temperature control station 50 will operate so as to direct all of the required combustion air into the wind box 13, with none of the air bypassing through the heat exchanger. However, should the sludge solids concentration fall exceptionally low where even a 100% air preheating operation would not suffice for sustaining desired minimum combustion temperatures, then the temperature control station may operate to initiate the injection into the fluidized bed of an auxiliary fuel as from supply station 34, by automatically actuating the fuel valve 18c as indicated by the dotted line control connections 51. But, when the solids concentration again rises, the response of the control station 50 will be such as to discontinue the auxiliary fuel supply and again to rely on controlling the operation of the preheat proportioning valve 30 for effective temperature control.

In order that the combustion unit may be started cold, auxiliary fuel for the auxiliary burner 17 may be drawn from the supply station 34 at a rate controlled by valve 18a, with the proportional valve 30 then directing all of the combustion air at least initially through the heat exchanger 24a and with at least part of the preheated air directed to the fuel burner as by the operation of a valve 53.

In practicing the invention, it is among the advantages that gritty particles or sand normally present in the sewage, need not be removed as by means of a degritting operation such as employed in conventional treatment systems. Instead, the sand or the like being carried through all of the above described conditioning operations, may finally join the fluidized bed of sand maintained in the combustion zone. Therefore, sand particles that may become disintegrated by abrasion in the course of operation and are carried away with the combustion gases for interception by the scrubber, are thus replaced by sand particles introduced together with the sludge. In this way, the sand bed may become at least partially self supplying and self grading.

Figures 1, 1A:
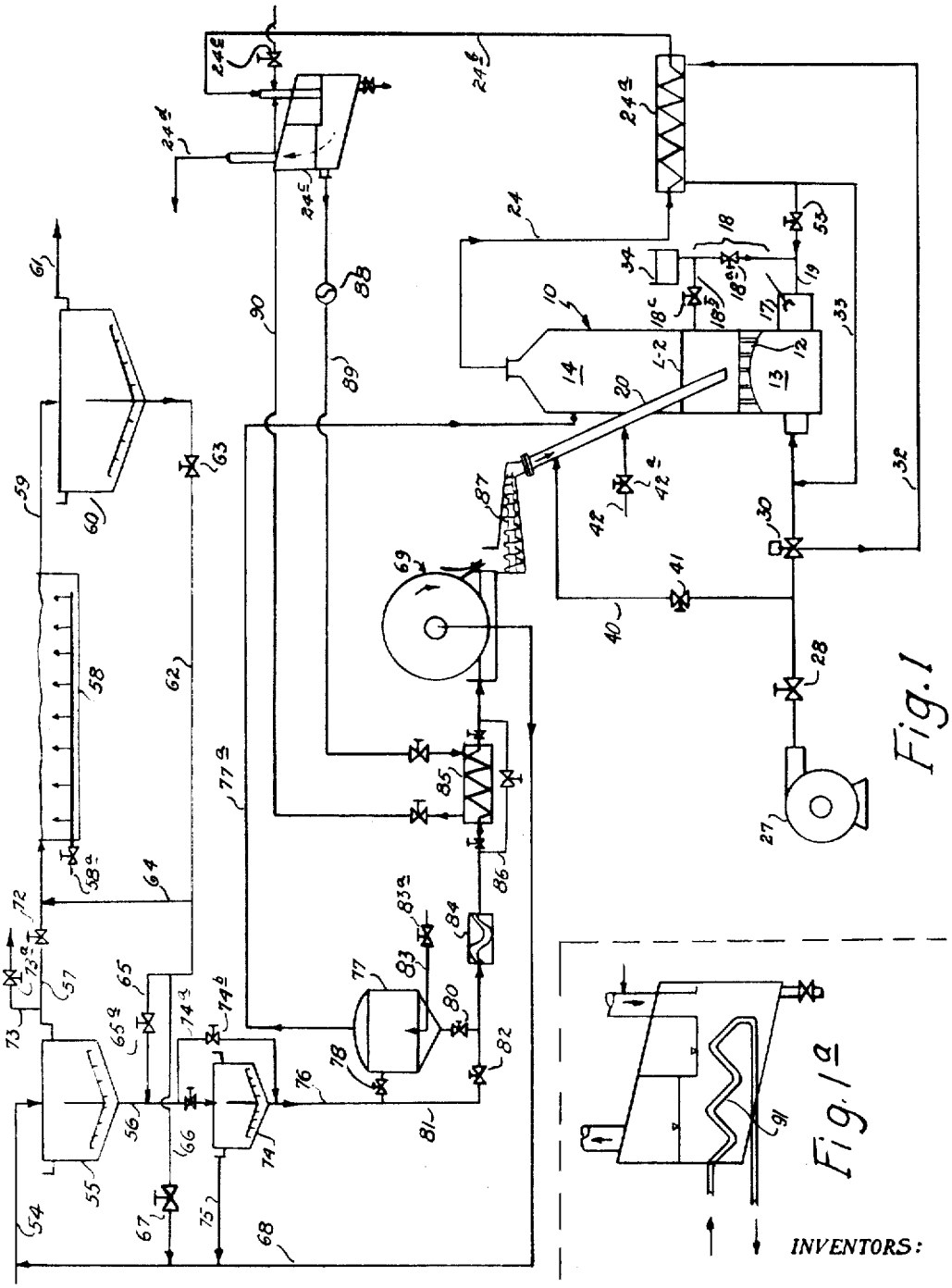
FIG. 1 is an example of a complete treatment flowsheet, with a combination of a sewage sludge thickener and continuous filter delivering a mixture of primary and activated sludge dewatered for use in the combustion operation, including air-preheating and sludge-preheating means.
FIG. 1a is an enlarged detail view of the sludge preheating means included in the flowsheet of FIG. 1.
Figure 2:
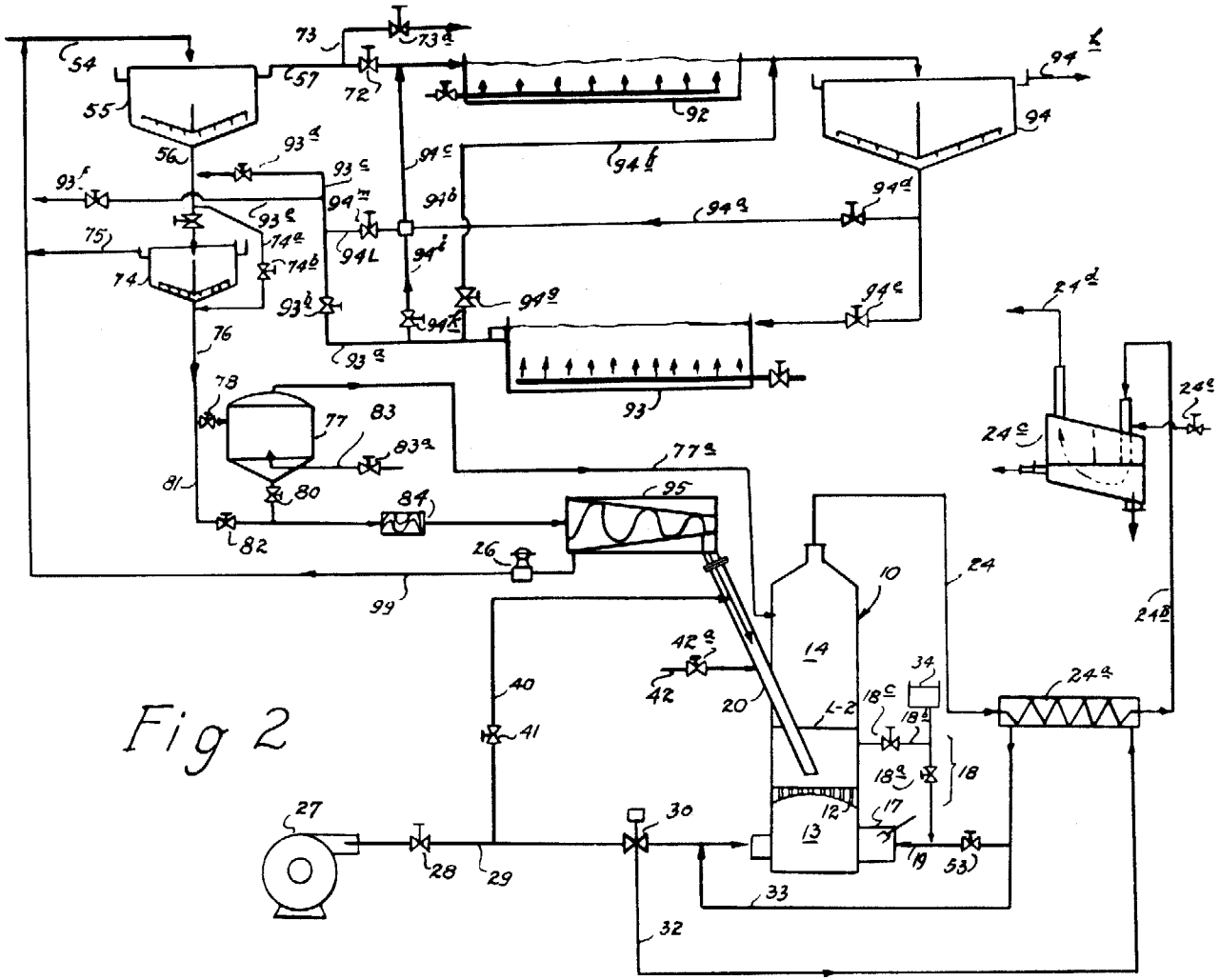
FIG. 2 is another complete treatment flowsheet modifying the flowsheet of FIG. 1 by the inclusion of an auxiliary oxidation station and the use of a centrifuge instead of the filter.

The sludge combustion operation in the manner described above in accordance with the arrangement of FIG. 5, may be embodied in various treatment systems receiving raw sewage sludge for disposal, such as exemplified in FIGS. 1, 2 and 3 respectively. These treatment systems differ from each other mainly with respect to the manner in which they attain the concentration of the organic solids in the sludge so as to be suited for the above described combustion in the fluidized bed as a means of ultimate and inoffensive disposal.

The treatment systems exemplified in FIGS. 1, 2, 3 illustrate ways in which putrescible mixed sewage sludges may be conditioned for the purposes of this invention, mixed sludges being understood to be those mixtures which combine raw primary sedimentation sludge with secondary sludge resulting from the aerobic treatment of the primary clarifier effluent. In view of the fact that secondary sludges and therefore the mixed sludges offer relatively high resistance to solids dewatering as compared with raw primary sludge alone, the following treatment systems according to FIGS. 1, 2, and 3 provide ways in which such mixed sludges may be concentrated effectively to the extent required by the above described specially conducted combustion operation. Each of these treatment systems involves first the thickening of the thin mixed sludge and then subjecting the thickened sludge to further concentration as by a continuous vacuum drum filter or by a suitable centrifugal machine as the case may be in view of the respective characteristics of the mixed sludges predicated upon the kind of secondary treatment used.

In connection with this invention, either raw primary sludge alone or mixed sludges can be thickened effectively for instance if the thickening operation is conducted and controlled in accordance with the teaching of the patent to Torpey No. 2,850,449 further discussed below, whereby concentrations of raw primary sludge alone are attainable to the extent of about 9% to 12% total solids, while mixed sludges may be concentrated to about 5% to 9%, more or less. At any rate, this controlled thickening operation will furnish mixed thickened sludges best suited for additional concentration as above indicated, for example either by continuous vacuum filter operation or in the centrifugal machine, as the case may be. Mechanical dewatering as herein used is intended to refer to the forced removal of water, as for example by such filtration or by centrifuging.

There are instances where the inclusion of the thickener may not be necessary. For example, in the smaller treatment plants where the rate of solids supply in the sludge is small relative to the capacity of the centrifuge, the thickener may be omitted without adversely affecting the overall performance of the disposal system of this invention, while relying upon the centrifuge to produce the required sludge concentration at a high degree of solids capture.

For example, where the primary clarifier effluent is subjected to conventional activated sludge treatment operation as in the treatment system exemplified in FIG. 1, the use of a vacuum filter is here shown rather than a centrifugal machine, for effecting the required additional concentration, that is where the proportion of activated sludge produced is relatively large in comparison to the amount of primary sludge available.

However, in the treatment system of FIG. 2 a centrifugal machine is shown to be employed rather than the vacuum filter, for the reason that the activated sludge system in that instance is operated with a long term aeration period effective to significantly reduce the amount of secondary sludge produced in a manner furthermore to be described below.

The use of such a centrifuge is furthermore proposed in the embodiment of FIG. 3, where secondary treatment is carried out by means of trickling filter operation producing a secondary sludge which when mixed with the primary sludge is more readily concentratable than is the aforementioned activated sludge in FIG. 1.

Heating of the thickened sludge mixture prior to further concentration as by the application of waste heat from the combustion gases, is also provided for by this invention, so that the concentration of mixed thickened sludges may thus further be facilitated, particularly in conjunction with a vacuum filter operation.

Referring to the treatment system of FIG. 1, a supply line 54 delivers raw sewage into a primary clarifier tank 55 which in turn delivers the so-called primary sludge passing through underflow line 56 to be prepared for further concentration. An overflow line 57 delivers primary effluent containing the suspended sewage solids from tank 55 for further separation in an aerobic treatment station. The aerobic treatment in this embodiment is represented by an aeration tank 58 with air distributing equipment indicated at 58a, the operation of which may be controlled in the well known manner of an activated sludge treatment system effective to convert the suspended and the soluble organic sewage solids into settleable biologic flocs. A transfer conduit 59 delivers the floc laden liquid from the aerobic treatment tank to a conventional secondary final clarifier tank 60 which in turn delivers clarified and purified overflow indicated at 61. The secondary underflow or activated sludge containing the settled biologic flocs discharges through an underflow line 62 by way of a control valve 63, having a solids concentration usually in a range of about ½% to 2%.

The secondary underflow line 62 has a branch 64 through which this underflow is recirculated to the head end of the treatment tank at suitably controlled rates for properly sustaining the biologic activity in the tank for continued biologic floc formation. Also, the secondary underflow line 62 may have a waste discharge connection 65 provided with a control-or shut-off valve 65a.

The primary overflow line 57 is equipped with a control and shut-off valve 72 whereby the aerobic treatment section may be disconnected, and has a waste connection 73 provided with a valve 73a whereby the primary overflow may be diverted. Waste sludge from the secondary tank 60 may join the primary underflow line 56 to provide the aforementioned mixed sludges for further concentration, or it may mix via line 66 through valve 67 with the return flow of the filtrate liquor carried by line 68 and then with the raw sewage for retreatment through the primary tank, or else the two courses may be used in combination.

The resulting mixed sludge is then subjected preferably first to a thickening operation as in a thickening tank or thickener 74. The operation is preferably conducted in accordance with the teachings of the abovementioned patent to Torpey No. 2,850,449 summarized directly below which makes it possible to consistently produce relatively highly concentrated raw sludges either primary or mixed, and finally for combustion in the fluidized bed. Primary sludge total solids concentrations are thus attainable in the order of 9% to 12%, while mixed sludge concentrations thus attainable may be in the order of 5% to 9%. Effluent from the thickening tank 74 may be returned to the clarifier 55 through effluent line 75 leading into the filtrate return line 68 which in turn leads to the raw sewage supply line 54 delivering into the primary clarifier 55.

The thickening operation in the thickener 74 according to the aforementioned Torpey patent, in summary, proposes to conduct the clarification operation and the thickening operation separate from each other, and in such a manner as to deliver from the clarifier a high quality primary effluent freed as far as possible of suspended organic sewage matter for the benefit of subsequent aerobic treatment of this effluent, while delivering from the thickener a sludge consistently of high controlled concentration such as to benefit the further concentration.

Briefly, according to this patent, a high grade primary effluent containing a minimum of suspended sewage matter is obtainable if the primary underflow sludge is drawn from the clarification tank purposely at relatively high dilution as a result of relatively short detention in the tank. With the sludge thus remaining substantially unaged and relatively fresh, putrefaction of any sludge solids and resultant gassing will not occur deteriorating the quality of the primary overflow.

According to the patent, this primary fresh sludge is subjected to a specially controlled thickening operation involving among other specified controlled operating factors a sludge bed of substantial depth so controlled with respect to sludge detention time that septicity will not develop even though a thickened sludge of high solids concentration is thereby consistently produced. Thus, with the operation of both the clarifier and the thickener controlled and coordinated in accordance with the teachings of that patent, only a relatively very small but highly loaded thickening tank is required, occupying an area which may be about one twentieth of the clarifier tank.

With the proportion of secondary sludge thus relatively minimized due to capture in the primary tank it will be appreciated that the mixed sludge then becomes proportionately more readily amenable to concentration not only by the thickening operation but also with respect to the further concentrating treatment required to condition the sludge for combustion in the fluidized bed.

The thus thickened sludge from tank 74 according to this embodiment is then subjected to further concentration as on filter 69 delivering a filter cake material which may have the aforementioned solids concentration of about 23% to 40% depending more or less upon the mode of the filter operation and upon the extent of solids capture in the primary clarifier tank, the effectiveness of the thickening operation, the character of the secondary sludge component, as well as upon the ratio of the quantities of the primary to the secondary sludge material in the mixture. In this respect, it may be said however that secondary sludge produced by the conventional activated sludge treatment operation is of a kind that will retain a liquid rather stubbornly unless there are ameliorating circumstances. Therefore, in dealing with a mixed sludge having an unfavorable ratio of such secondary sludge to the primary sludge component, the use of the continuous vacuum filter may be preferable to a centrifuge.

The filtratae liquor from this filtration operation may be returned through the aforementioned conduit 68 into the raw sewage supply and thus into the primary tank 55. The resulting filter cake material having the desired solids concentration is then subjected to complete non-odorous combustion in the aforementioned fluidized bed and in a manner above described and carried out in the arrangement illustrated in the FIG. 5 as an example.

More particularly for practical purposes, in the embodiment of FIG. 1 a transfer conduit 76 delivers the specially thickened mixed sludge to a holding tank 77 which may have a capacity of 2 to 3 days mixed sludge supply. The inlet to this holding tank has a control valve 78, while the outlet has a control valve 80, so that the tank may be bypassed as through a bypass connection 81 provided with a control valve 82. The holding tank 77 in this example is equipped with compressed air agitating means indicated by pressure air supply 83 controllable by a valve 83a. In this way, mixed thickened sludge may be supplied either from the holding tank or directly from the thickener 74 or from both, to a pump 84 which may be of the metering type such as a Moyno pump for feeding the thickened sludge mixture through a liquid-to-liquid type of heat exchanger 85 or through a bypass 86, or else through both, to the aforementioned continuous vacuum filter 69. A vent pipe 77a connects the holding tank 77 with the free board space above the fluidized bed in the composition unit 10, whereby any spent agitating air along with any gaseous constituents developed in the holding tank may be disposed of by combustion.

A conical screw feeder 87 of the pressure extrusion type is shown in this connection as a means for introducing the filter cake material through the feed pipe 20 into the combustion zone or bed of fluidized material in the combustion unit 10 described above with various accessories including the blower 27, the gas-to-gas heat exchanger 24a the auxiliary fuel supply 34, and the auxiliary burner 17, the fly ash scrubber unit 24c, and the control stations 45 and 50 regulating the combustion zone.

Furthermore, featured by this invention is an arrangement wherein a pump 88 in a transfer line 89 supplies scrubbing water heated by the combustion gases to the aforementioned liquid-to-liquid heat exchanger 85 for counter-currently heating therein the thickened feed sludge preparatory to subjecting it to treatment on the filter 69, with spent scrubbing water returning through pipe 90 to the scrubber unit 24c. Yet, by way of modification (see detail FIG. 1a) pipe coils 91 carrying the thickened feed sludge are located directly in the hot scrub water reservoir in the scurber unit proper, in which case a pump will deliver thickened sludge to the scrubber, while heated sludge returns to facilitate the filter operation. To the extent that the treatment system of FIG. 2 resembles that of FIG. 1, like parts of the equipment are all designated by like numerals. Such resemblance is found in a provision of the primary clarifier 55, the thickener 74, the holding tank 77 for thickened sludge, the metering or Moyno pump 84, and the combustion unit 10 with its accessories such as the blower 27 for the combustion air, the gas-to-gas heat exchanger 24a controlled by the proportional three-way valve 30, the auxiliary fuel supply 34, and the fly ash scrubber unit 24c, as well as the control stations 45 and 50, all of which elements operate substantially in a combination as above described and are designated by the same numerals as the corresponding parts in FIG. 1.

A difference, however, is found in the arrangement of the aerobic or secondary treatment section, in that a conventional activated sludge aeration tank 92 is cooperatively associated with an auxiliary oxidation treatment tank 93, both being operatively connected to a secondary or final settling tank 94. In this way, by inducing aerobic digestion or destruction by auto-oxidation of a portion of the organic biologic flocs in the auxiliary tank 93 there is attainable a significant reduction in the total amount of organic solids in the secondary sludge, thus rendering the mixed sludge relatively more amenable to the subsequent solids concentration and thus more effectively treatable by centrifugal separating force. A centrifugal machine 95 is therefore shown to be employed in this embodiment instead of drum filter 69 of FIG. 1, which centrifuge may be similar in construction as well as operation to the one indicated at 22 in FIG. 1 and more particularly illustrated in the detail FIG. 4. More particularly, in order to provide a concentrated sludge mixture suited for combustion in the fluidized bed, the auto-oxidation in tank 93 may be controlled so as to bring about a reduction of secondary volatile suspended matter of 40% to 60% which then results in a ratio of from about 2:1 to about 4:1 of primary to secondary sludge, favorable for attaining the aforementioned concentration range of about 25% to 35% for the combustion.

There are various ways of conducting the secondary treatment operation in this embodiment, even though all of them in some way require the recycle of activated sludge. In this instance activated sludge is pumped as underflow from tank 94 as through pipe 94a, and then via junction 94b and pipe 94c back into the main aeration tank 92, the recycle rate being indicated by control valve 94d. In addition in this example, excess activated sludge from tank 94 is diverted as through control valve 94e to the auxiliary oxidation tank 93 where a substantial portion of the organic sludge solids or flocs are destroyed by extended aeration. The resulting oxidized sludge may normally be transferred through conduit 93a as controlled by valve 93b either through the thickener 74 via branch 93c and control valve 93d, or to the primary clarifier 55 via branch 93e and control valve 93f, or both these branches may be used in conjunction with each other.

However, when indicated, part or all of the oxidized sludge from tank 93 may be transferred directly back into the final tank 94 via pipe 94f through control valve 94g. The advantage obtainable by routing the sludge in this way lies in the fact that the non-settleable high ash solids will pass into the overflow 94h of the final tank while the residual organic matter of flocs will settle in the tank whence they may be withdrawn for retreatment in the system as set forth above. In this way, a buildup of ash solids in the system is discouraged.

Moreover, there is provided a cross connection 94i leading from pipe 93a to junction 94b provided with control valve 94k operable to permit a portion or all of the oxidized sludge to be returned directly to the main aeration tank 92 via line 94c. A connection 94L with control valve 94m is provided so as to permit wasting activated sludge from the final tank either to the thickener 74 or to the primary clarifier 55.

By way of modification, the main aeration tank itself may be utilized to provide the auto-oxidation effect and consequent reduction in volatile matter, if relatively low loading conditions are maintained for example 0.02–0.10 lb. B.O.D. per lb. of suspended solids in the sludge mixture. That is to say, at this low loading rate a considerable portion of the volatile suspended solids are self-oxidized. Concurrently, the ash material released by the oxidation of volatile matter becomes non-flocculating and therefore will not settle in the final tank 94 of the aerobic treatment system, but will pass out with the effluent 94 discharging from the system. Consequently, a substantially lower total volume of sludge matter is wasted from the aerobic treatment system to the thickener 74, thus benefiting the subsequent dewatering operations which prepare the mixed sludge for combustion in the unit 10.

The solid bowl type centrifugal machine herein exemplified in the treatment system of FIGS. 2 and 3, may be pressurized for purposes of this invention so that it may be operated as part of a pressure system, communicating through the feed pipe 20 with the interior of combustion unit 10. The machine as shown in FIG. 4 has a rotor structure 96 operating in a housing 97 which is sealed against the atmosphere. The housing has a discharge neck 98 delivering separated liquid, connected to the aforementioned differential pressure discharge valve 26 (see FIG. 3), with a return conduit 99 carrying the thus separated liquor from the centrifuge back into the primary settling tank 55 via the raw sewage supply line 54. The centrifugally separated solids fraction leaves the machine through a discharge neck 99a of the housing connected through the feed pipe 20 with the combustion unit 10.

The rotor structure 96 comprises a body portion or shell 100 of trunco-conical configuration. The narrow end of this shell is closed by end plate 102 at which the separated solids fraction may discharge centrifugally as through openings 103 provided in the adjacent narrow end portion of the shell. The wide end of this shell has a transverse end plate 104 provided with overflow openings 105 associated with adjustable weir plates 106 determining the line of overflow of separated liquid indicated by the arrow D and thus equally defining the volume of the annular centrifugal liquid body O.

Within the rotor shell there is in turn rotatably mounted a conically shaped flight conveyor element 107 rotated at a differential speed relative to the rotor shell, so that the flights 107a will move centrifugally separated solids from the liquid body O to emerge onto the narrow end portion or so-called beach portion H of the shell, and finally discharge centrifugally through the openings 103. Feed pulp enters this machine through an axially arranged feed tube 108 rotating with a conveyor element 107 and discharging feed material for example into receiving chambers 109 and 110 formed in the hollow hub portion 110a of the conical flight conveyor element, and then through openings 110b into the liquid body O undergoing centrifugal separation in this shell. As a result of the foregoing conditioning operation in the thickening tank and then in the centrifuge, the sewage material delivered to the combustion unit 10 will have a solids concentration suited for complete non-odorous combustion in the fluidized bed, with the combustion controlled substantially in the manner above set forth (see FIG. 5).

The treatment system according to the embodiment in FIG. 3, in turn, resembles the one described above in FIG. 2, and to the extent of that resemblance like parts will again be designated by like numerals. Such resemblance is found in all comparable respects including the solid bowl centrifugal machine just described and shown in FIG. 4, except for a change in the secondary treatment phase featuring the use of a trickling filter system that will produce a type of secondary sludge which in mixture with the primary sludge is relatively more amenable to centrifugal separation as compared with conventional activated sludge. By way of example, this secondary aerobic treatment system comprises a trickling filter unit 111 operating in circuit with a secondary settling—and detention tank 112 which latter discharges final clarified and purified overflow 113. The secondary sludge from the final tank 112 eventually reaches the thickener 74 to be mixed with a primary sludge for example by way of the branch connections 114 and/or 115 through respective control valves 114a and 115a.

As here exemplified, this trickling filter receives effluent from the primary clarifier through effluent conduit 55a provided with control valve 55b and leading to the trickling filter 111 which operates to convert the organic solids into humus sludge. Effluent from the trickling filter is delivered through conduit 111a to the final tank 112 where the humus sludge will settle to be returned through underflow conduit 112a preferably to the thickener 74. However, during periods when the thickener 74 is out of operation, the secondary sludge from the final tank may be returned to the primary clarifier in order that mixed sludge may be routed via valve 74b through bypass conduit 74a to the centrifuge 95. This secondary treatment system requires that a portion of the final effluent 113 be continuously returned to the trickling filter 111 as by way of transfer conduit 113a.

Such a trickling filter operation is distinct from the activated sludge aeration treatment, is effective to produce a kind of secondary sludge or humus which in mixture with primary sludge may be thickened in the manner above set forth so that further concentration in the centrifuge, instead of on the vacuum filter, will result in a mixed sludge product sufficiently concentrated for combustion in the fluidized bed. Hence, the nature of the secondary sludge thus produced may be considered as comparable to some extent to the aforementioned partially aerobically digested activated sludge (see FIG. 2 above described), insofar as it will provide in the sludge mixture a favorable ratio of primary sludge to secondary sludge about 3:1 to 5:1 suited for concentration in the centrifuge and final disposition by combustion in the fluidized bed.

Another applicable method of secondary treatment to provide suitable mixed sludges for the purposes of this invention is what is known as modified aeration, which is an intermediate type of activated sludge treatment effective to remove about 60%–70% of the B.O.D. in the raw sewage. The resulting sludge can then be concentrated by the above described thickening operation of the Torpey patent to a much higher degree than mixed activated or mixed trickling filter sludge, thus lending itself readily to further dewatering by the action of a centrifuge.

Still another method of conditioning the sewage for the combustion purposes of this invention may involve the application of coagulating agents such as alum, ferric chloride, lime, and others to the raw sewage prior to its entering the primary settling tank. Such treatment will remove a significant portion of the suspended matter through coagulation of colloidal particles into suitable agglomerates. Therefore, the degree of thickening and further concentration attainable with a sludge thus conditioned will be similar to that of primary sludge alone or of the aforementioned modified aeration sludge.

Furthermore, it will be understood that in all instances, if the secondary treatment is temporarily suspended, the primary sludge alone may be concentrated in the same manner as the various mixed sludges. But where secondary treatment is altogether not required, the further concentration of thickened primary sludge can be readily effected in a solid bowl type centrifuge.

Also applicable to all the foregoing embodiments is the provision of the storage tank 77 having a capacity from one to three days storage of thickened sludge allowing for shutdowns occurring for example during weekend periods or in emergencies. The contents of the storage tank is agitated periodically as by means of high pressure air of, say, 7 lbs. pressure, the agitation being applied with sufficient frequency to prevent solids segregation in this storage tank. This storage tank is closed so that any sludge gases together with the mixing air may be sent through pipe 77a for deodorizing by combustion into the freeboard space above the fluidized bed of the combustion unit where temperatures in the order of 1800° F. may be developed insuring that any of the gaseous matter be disposed of by afterburning in the freeboard space above the fluidized bed.

While the invention provides an economical as well as highly compact arrangement of sludge disposal as compared with conventional anaerobic sludge digestion systems, there are to be found existing digester installations where the final disposal of the digested sludge presents a serious problem. This invention presents a means for eliminating the large and uneconomical sand drainage beds normally provided for handling the dilute digester sludges, which are especially objectionable because of space requirements and the labor required to remove the dried sludge from the beds, and where the presence of such beds is otherwise objectionable as for environmental reasons.

For the purposes of this invention, therefore, dilute digester sludge may be prepared for subsequent combustion in the fluidized bed, conducted and controlled in the manner set forth above. For example, a dilute digester sludge of about 5% solids concentration may be dewatered effectively centrifugally as in a machine above described so as to attain a concentration of about 35% to 50% solids content. In this way, autogenous combustion conditions are attainable in spite of the relatively low heat value of the digester sludge. Moreover, if desired, digester gas may be employed as an auxiliary fuel in the combustion operation. Furthermore, as distinct from conventional digester operation, all of the organic material in the digester sludge is rendered in the form of readily disposable ash. Moreover, any critical digester controls such as heretofore necessary to provide an acceptable digester sludge product, becomes unnecessary in a practice of this invention, since the amount of residual undigested organic matter in the sludge after digestion becomes immaterial in view of the subsequent specially conducted combustion operation, so that the digester can therefore be grossly overloaded.

OPERATION

Starting and re-starting the combustion operation

After the combustion unit has been supplied with the charge of graded sand, the bed of fluidized particles must first be established and heated at least to the minimum operating temperature at which combustion of the volatile matter in the concentrated yet moist sludge may be ensured. To this end, from a cold condition of the combustion unit 10 (see FIGS. 5 and 6), the auxiliary burner 17 is started burning a suitable fuel, for example oil from the supply 34 to produce hot combustion gases in the windbox 13 underneath the constriction plate 12, effective to heat and fluidize the mass of inert sand particles above the constriction plate. Preferably, during this phase the rate at which combustion air from blower 27 is applied to the burner is such that the windbox temperature will not exceed temperatures of, say 1800° F. to 2000° F., compatible with the heat tolerance of the windbox and of the constriction plate.

Gaseous fuel such as propane or the like may be used in lieu of oil for the burner operation which may be continued until the fluidized bed shall have attained at least minimum sludge burning temperature concurrent with the state of fluidization. When that condition is established the moist sewage sludge prepared to the proper solids concentration may then be fed into the bed to undergo complete combustion, with the combustion air now applied to the windbox from the blower, instead of the auxiliary combustion gases, at such a rate as corresponds to the volatile solids loading rate and to the gas velocity required to maintain fluidization of the sand. However, the start-up time for this auxiliary burner operation may be shortened by the injection of fuel oil directly into the bed at the time when the bed has been heated by the burner to oil ignition temperature, this fuel injection to be continued until the minimum bed operating temperature has been attained. Yet, the start-up time is still further reducible by using the spent combustion gases in a preheater for preheating the combustion air supplied to the burner. In this way, the consumption of start-up fuel is minimized while operating temperature is achieved in a minimum of time.

Re-starting the combustion unit after a shutdown can be readily effected due to the heat storing characteristics of the subsided mass of the inert granular material.

For example, for a shutdown period of, say, 4 to 8 hours, with a reservoir of residual heat in the combustion unit available, the supply to the unit of combustion air and concentrated feed sludge may be resumed directly without the burner operation, provided the bed temperature at the time of shutdown was maintained sufficiently high, namely 1400° F. or higher, and the blower operation stopped.

In case of shutdown periods in excess of about 8 hours and up to about 24 hours, re-starting was effected with the aid of injection of fuel oil directly into the bed and combustion air supplied by the blower, the inert material having remained sufficiently hot to ignite the oil. In this instance, the auxiliary fuel oil burner need not be used, and reheating the windbox walls as well as the constriction plate and the consequent time delay is thereby eliminated.

Re-starting under the conditions above indicated has been possible in view of the fact that after a shut-down the bed temperature was observed to drop from 1500° F. to 1100° F. with 10 hours, and to drop down to 550° F. during a shutdown period of about 34 hours.

Combustion control

Once the operating temperature has been attained by the above starting or re-starting procedures, the sludge combustion operation requires control of the bed temperature and of the air/solids ratio concurrently to ensure complete and odorless combustion.

The temperature control is based upon the following consideration: For a given air supply rate, sludge solids concentration, and sludge feed rate, there exists an equilibrium operating temperature at which autogenous combustion is maintainable. However, since the ratio of combustion air to sludge solids as well as the sludge feed rate are kept fairly constant in a practical operation, the equilibrium temperature depends mainly on the sludge solids concentration. Thus, for example, in the pilot plant herein referred to, with a primary sewage sludge of 33% total solids concentration, an equilibrium temperature of 1650° F. was maintainable without preheating the combustion air.

However, preheating part or all of the combustion air furnished by the blower 27 by means of the combustion gases or stack gases permits the feeding into the combustion unit of a prepared sludge of relatively greater moisture content while still maintaining an adequately high combustion temperature, as well as provide a means for controlling the operating temperature of the fluidized bed.

Hence, in the operation of the invention, indications of temperature changes derived for example from the thermo-couple 48 (see FIGS. 5 and 6) may be utilized for varying manually or automatically the proportion of the the combustion air to be preheated by the stack gas in preheater 24a. For example, the thermo-couple 48 through control connection 49 may report any deviation in bed temperature to the automatic control—or telemetry station 50 (see FIG. 5) which in turn through control connection 49a may initiate a corresponding opening or closing of the three-way proportioning valve 30 whereby correspondingly a larger or smaller proportion of the combustion air is sent through the preheater via conduits 32 and 33 into the windbox 13, thus maintaining the temperature at the desired operating level or within the desured operating range.

With the air preheating operating conducted in this manner and an adequate amount of combustion air, self-sustained odorless combustion of the moist primary sewage sludge solids was found to be maintainable with total solids concentration as low as about 23%, whereas without air preheat about 30% total solids concentration would be required for the sludge to maintain its own complete combustion in the fluidized bed.

In case the bed temperature should fall to a point below the minimum required for autogenous combustion, the control station 50 through control connection 51 may actuate valve 18c causing the injection of auxiliary fuel from tank 34 into the fluidized bed until at least the minimum operating temperature shall have been restored.

A further operating advantage gained from thus preheating the combustion air lies in the fact that ample excess air may be employed without unduly depressing the temperature of the fluidized bed, so that without necessitating critical solids/air $O_2$ content in the stack gases, complete and odorless combustion can be realized with variations in the sluge feed rate cushioned or compensated for by the available excess of air.

Concurrently the air/sludge solids ratio must be controlled in such a manner as to provide for sufficient oxygen to oxidize the organic matter in the sludge, plus the excess to ensure complete combustion. This ratio, however, varies only with changes in composition of the organic matter. As an example, activated sewage sludge may require 7 lbs. of air/lb. of volatile solids, while primary sewage sludge required 10 lbs. of air/lb. of volatile solids, including an excess required to ensure complete combustion.

Whereas the air/sludge solids ratio will not change materially in any given locality because of the substantially constant character of the sludge, the concentration of the feed sludge supplied for instance to filter 69 (see FIG. 1) or to centrifuge 95 (see FIG. 2) may vary daily, hourly, and even from one moment to another, resulting in corresponding variations in the sludge loading rate applied to the combustion unit where the feed pump 23 (see FIG. 5) supplies a constant volume.

Again, this air/sludge solids control may be manual, or it may be semi- or fully automatic. A highly effective control of this ratio may be provided by constant monitoring of the oxygen content in the combustion gases, for instance by the stack gas analyzer 43 reporting the $O_2$ content of the stack gases to the automatic control—or telemetry station 45 as through the control connection 44. This station in turn may initiate a corresponding change either in the rate of feed sludge delivery by pump 23 (see FIG. 5) as indicated by control connection 47, or else initiate a corresponding change in the rate of air supply from the blower through valve 26 as indicated by control connection 46, or both.

Instead of using the gas analyzer, proportional control of the combustion air/sludge solids ratio may be achieved by the use of a density meter for accurately and currently indicating the solids concentration of the sewage sludge. The density indications may then be utilized through a control—or relay station for metering and proportioning the combustion air or the sludge pumping rate or both.

Capacity of combustion unit

The capacity of the combustion unit, which is defined as the organic solids loading per unit of time and per unit of cross-sectional area of the fluidized bed, is dependent upon the rate at which combustion air can be supplied for maintaining the state of fluidization while satisfying the oxygen requirements of the solids for complete combustion.

This rate of air supply in terms of the "space rate" which is defined as the upward flow velocity of the combustion gases through the bed of inert granular material, must be great enough to maintain the fluidized state, yet not so great as to cause bed material to be blown out of the stack of the combustion unit. Accordingly, a prepared inert material is supplied to the bed, for example graded sand from which the oversize has been eliminated, to suit the air supply and fluidization requirements.

In practical operation, when concentrated primary sewage sludge was fed to the combustion unit in a pilot plant, it was found that variations of considerable magnitude in the space rate were feasible as corresponding variations in the capacity of the fluidized bed were realized, predicted upon a proper grading of the sand.

However in operation, it was also found that the bed itself will accumulate the proper grade of inert particles by classifying newly introduced graded material in such a way that the undersize is carried out together with the spent combustion gases.

Furthermore, since a minimum depth of the fluidized bed must be maintained for practical purposes, it is necessary to replenish the amount lost by attrition and through the stack. The need for addition of prepared sand appears when a significant decrease is observed in the pressure differential between the bottom strata and the top of the bed. That pressure differential is determinable during operation for instance with the aid of manometers provided at respective levels of the combustion unit, indicating the pressure respectively in said bottom strata and in the freeboard space above the bed.

More in particular, when operating the pilot plant herein referred to, average space rates of 2 to 4 feet per second and up to about 6 feet per second were found applicable in accordance with respective solids loading rates while attaining complete and odorless combustion with oxygen requirements of the sludge solids varying in a range of about 7 to 10 lbs. of air per lb. of volatile solids depending upon the characteristics and the type of sludge, plus the excess air to insure complete combustion.

Thus, in the practice of the invention, at least a twofold or even greater variation in the solids loading is applicable by a corresponding change in the space rate with the inert material grading itself in the fluidized bed.

Heat storage characteristics of the fluidized bed

While the above stated operating characteristics of the fluidized bed of inert materials or sand are the basis for attaining the combustion conditions called for by the invention, this material also tends to stabilize the combustion temperature because of its heat storing capacity. The inert material also provides sufficient heat storage for promptly restarting the combustion after a shutdown period.

Thus, the heat storage capacity of the sand is effective to resist combustion temperature changes attributable to fluctuations in any one or more of the operating factors set forth above that control the combustion operation, thereby rendering the bed self-stabilizing. Furthermore, such buffering effect of the material provides sufficient time delay for an operator to adjust the air supply rate or the rate of solids feed or both, after an alarm or the like has indicated the need for temperature correction.

This fact is substantiated by the following example:

OPERATING CONDITIONS

Assume:

(a) $T_{Bed}=1400°$ F.
(b) $TS_F=35\%$
(c) Volatile=70%
(d) Space Rate=4 ft./sec. (VS Loading–0.39 lb./sq. ft./min.)
(e) Heat in Bed=16,000 B.t.u./cu. ft. of fluidized bed
(f) Bed Depth=36" when fluidized
(g) Fluidized Bed Density=65 lbs./cu. ft.
(h) 8 lb. air/lb. TS=Combustion air requirement with 10% excess

CHANGE IN OPERATION

Assume:

The total solids content TS in the discharge cake drops to 30%, while pump rate and feed concentration to centrifuge or vacuum filter remains constant.

With the above operating conditions (a) to (g), the time delay for a temperature drop from 1400° to 1200° F. without preheating, is determinable as follows:

Heat Input — B.t.u./sq. ft./min. @ 1400° F.:

| | B.t.u./min. |
|---|---|
| 0.39 lb. VS. | 4095 |
| 4.48 lb. air | 60 |
| Total | 4155 |

Heat Output — B.t.u./sq. ft./min. @ 1400° F.:

| | B.t.u./min. |
|---|---|
| 0.39 lb. VS (Combustion gas) | 2145 |
| 1.31 lb $H_2O$ (Water @ 30% TS) | 2320 |
| Radiation | 200 |
| Total | 4665 |

Heat deficit at 1200° F. calculated in the above manner is found to be 0.

Average Heat Deficit between 1400° and 1200° F.

$$=\frac{4665-4155}{2}$$

=255 B.t.u./min. loss in heat content of the inert bed between 1400°–1200° F.

Heat Content of Bed between 1400° F.–1200° F.:

$$\text{Total Heat} = \text{Sp. ht.} \times d_s \times H_{Bed} \times T$$
$$= 0.19 \times 65 \times 3.0 \times 200$$
$$= 7510 \text{ B.t.u. in volume 1 ft sq.} \times 3' \text{ high.}$$

$$\therefore \text{Elapsed time} = \frac{7510}{255}$$

$$= 30 \text{ min.} \longleftarrow \text{Time elapsed before bed reaches 1200° F.}$$

Hence, ample time is available for rendering the operating controls effective either automatically or manually.

Graphical presentation of the combustion characteristics

Following is the discussion of the operating curves in FIG. 7, illustrating graphically the use of air-preheating for the purpose of maintaining the desired combustion temperatures in the fluidized bed.

This graph presents for various feed sludge concentrations the extent of air-preheating necessary in order to maintain a certain combustion temperature such as will ensure complete non-odorous combustion in the fluidized bed. In this instance, the preheater operates at a temperature differential $\Delta T = 200°$ F. between the temperature of the combustion gases entering the preheater and the temperature of the preheated air leaving the preheater.

This graph has as a basis the "combustion equilibrium" defined as the temperature to which the mixture of evaporated moisture and combustion gases is raised by the self-sustained combustion of the sludge, also termed the autogeneous combustion temperature. The graph, therefore, is based upon the combustion equilibrium curve $L_1$–$L_2$ plotted for a certain sludge with solids concentrations on the right hand ordinate vs. the corresponding autogenous combustion temperatures on the abscissa attained without the addition of external heat.

As previously indicated, in practicing the invention a practical temperature operating range lies between 1200° F. and 1600° F. Thus, while the minimum combustion temperature for conventional incineration units which is about 1400° F., in the practice of this invention a temperature of about 1200° F. will suffice for attaining complete and odorless combustion of moist sludge in the fluidized bed. Several reasons offered in explanation of this phenomenon are that the high heat content of the inert material in the bed would cause explosion like flash evaporation of the moisture, while uniform heat distribution throughout the bed prevents incomplete combustion as in a zone of lower temperature. Moreover, the inert material in turbulent motion would cause comminution of the volatile matter into smaller and smaller particles flavoring rapid combustion.

Furthermore, since the sludges in different localities differ with respect to elemental composition as well as with respect to the amount of volatile matter, each sludge thus differentiated is representable by its individual equilibrium combustion curve.

The example of the equilibrium curve $L_1$–$L_2$ in FIG. 7 therefore represents the combustion chaarcteristics of a sludge having the following elemental composition:

Example.—A raw primary sludge, having 70% volatile matter in the total solids, has the following elemental composition:

| | Percent |
|---|---|
| C | 68.0 |
| H | 9.5 |
| O | 18.6 |
| N | 3.0 |
| S | 0.9 |
| | 100.0 |

The heat value of the above composition by standard thermal determination is:

7,350 B.t.u./lb. of total solids
10,500 B.t.u./lb. of volatile solids

The combustion air required by the above composition is:

8 lbs. of air/lb. total solids, including 10% excess air to ensure complete combustion.

The above elemental analysis and heat value constitute the basis from which the corresponding equilibrium curve $L_1$–$L_2$ for this sludge can be plotted point by point by determining for each combustion temperature the coordinate solids concentration necessary to produce autogenous combustion.

Determination of point $P_1$ of Equilibrium Curve (FIG. 7)

With VS=Volatile solids
And TS=Total Solids

Combustion temperature: 1400° F.
Heat input:

0.7 lb. VS=7350 B.t.u. since 1.0 lb. TS at 70% Volatile=0.7 lb. VS
8.0 lb. combustion air= 120 B.t.u. (Heat content in air supply)

Total=7470

Heat output:

0.7 lb. VS= 3850 B.t.u. (Heat contained in the combustion gases)
X lb. $H_2O$= Y B.t.u. (heat of water vaporization)
4% Radiation= 300 B.t.u.

4150+Y B.t.u.

Since Input equals Output,

Y=7470—4150
Y=3320 B.t.u. left for vaporizing and super-heating the water,
X=3320, since 1770 B.t.u. required for heating /1770 1 lb. $H_2O$ to 1400° F., or X=1.87 lb. $H_2O$ is present with each lb. of Total Solids in the Sludge, so that the Total Solids Concentration is:

$$TS = \frac{1.00}{1.00 + 1.87} \times 100 = \frac{1}{2.87} \times 100$$
$$TS = 35\%$$

Thus, point $P_1$ on curve $L_1$–$L_2$ represents autogenous combustion at 1400° F. and 35% Total Solids Concentration in the feed to the combustion unit.

Similarly, one may establish point $P_2$ representing a combustion temperature of 1200° F. with a coordinated Total Solids concentration of 30.3%.

Referring again to FIG. 7, all practical operating conditions that require preheating of the combustion air because of inadequate solids concentration in the feed, are representable by points located within the enclosed area $L_2$, $P_2$, $Q_1$, $Q_2$, for a sludge such as the one above identified and with the preheater operating at the aforementioned temperature differential $\Delta T = 200°$ F.

The practical significance of this "Preheat Area" in the chart of FIG. 7 is substantiated by the following examples:

Assuming the total solids concentration in a sludge of the above stated composition to be about 32%, autogenous combustion would result at an operating temperature of about 1270° F. as represented by point $B_1$ on the equilibrium line of the graph. However, if a higher operating temperature should be desired, for instance in the order of 1400° F., then preheating of about 22% of the combustion air would be required, and that condition is represented by point $B_2$ located vertically above point $B_1$ in the graph. Similarly, the aforementioned upper limit temperature of about 1600° F. attainable by preheating 45% of the combustion air corresponding to the point $B_3$ located vertically above of point $B_2$ in the graph. In this manner any desired operating temperature in the preheat area is attainable.

By contrast, in cases where the moisture content is too great for even attaining the minimum temperature of 1200° F. by way of autogeneous combustion, preheating of a substantial portion of the combustion air is necessary for attaining at least that minimum temperature. Thus, for example where the total solids concentration is in the order of 24% as indicated by point $A_1$ located on the equilibrium curve $L_1$–$L_2$, the preheating of about 80% of the combustion air is necessary according to the graph for establishing an operating temperature of 1200° F. as the lower limit. Similarly, preheating of 100% of the combustion air would be required in order to attain an operating temperature of about 1360° F. according to location of point $A_3$ in the graph representative of the upper temperature limit attainable under these conditions without the addition of supplemental fuel.

Practical operating conditions as defined by the preheat area in the chart of FIG. 7, present themselves in the following tabulation.

TABULATION A

| Temp., ° F. | Total Solids Concentration at 100% preheat | Total Solids Concentration at 0% preheat* |
|---|---|---|
| 1,600 | 26.4 | 40.0 |
| 1,500 | 25.0 | 37.5 |
| 1,400 | 24.0 | 35.0 |
| 1,300 | 23.5 | 33.0 |
| 1,200 | 22.8 | 30.3 |

*Equivalent to Autogenous Combustion.

Within the above tabulated limits, for practical reasons, it is desirable to maintain an average operating temperature of 1400° F. or higher whenever possible, with the temperature controls adjusted to provide 100% preheating of the combustion air whenever the temperature falls below 1400° F. However, in case the temperature falls below 1200° F., auxiliary fuel is introduced into the bed until the desired average operating temperature is restored.

Operating examples

The combustion unit of a pilot plant herein referred to was similar to the one shown in FIG. 6. The inside diameter of the fluidized bed was 22 in. with 14 in. of refractory lining including a ⅜ in. thick shell of steel making the overall diameter of the unit 36 in. The height of the combustion chamber above constriction plate was 9 ft.

The depth of the bed in its subsided state was 16 in. to 24 in., using a graded sand of minus 20 mesh.

This combustion unit, receiving primary concentrated sewage sludge from a centrifuge such as illustrated in FIG. 5, after 5 hours of operation with temperature maintained near the equilibrium at which autogenous combustion occurred without preheating the combustion air, produced the results tabulated below:

(A) RAW SLUDGE FEED

| Test Run No. | TS, percent | Vol., percent | VS, percent | VS, lb./hr. |
|---|---|---|---|---|
| 1 | 33.0 | 83.0 | 27.4 | 64 |
| 2 | 33.0 | 83.0 | 27.4 | 49 |

Wherein:

TS = Total Solids $$= \frac{\text{Dry w't of TS}}{\text{Wet w't of sludge}} \text{ expressed in percent}$$

$$\text{Vol.} = \text{Volatile} = \frac{\text{VS}}{\text{TS}} \text{ in percent of TS}$$

$$\text{VS} = \text{Volatile Solids} = \frac{\text{Dry w't of VS}}{\text{Wet w't of sludge}} \text{ in percent, and}$$

Volatile Solids (VS) supplied to Combustion Unit in terms of lb./hr. = (percent VS) (GPH) (8.34 lb./gal.)

(B) AIR SUPPLY

| Test Run No. | Air, lb./hr. | $O_2$, percent | $O_2$, lb./hr. |
|---|---|---|---|
| 1 | 523 | 23 | 120 |
| 2 | 523 | 23 | 120 |

(C) COMBUSTION CONDITIONS

[(1) Stack gas analyses]

| Test Run No. | $O_2$, percent | $CO_2$, percent | CO, percent | $SO_2$, percent | $N_2$, percent |
|---|---|---|---|---|---|
| 1 | 6.2 | 13.4 | 0 | 0 | 80.4 |
| 2 | 11.6 | 8.4 | 0 | 0 | 80.0 |

[(2) Combustion temperatures]

| Test Run No. | Bottom of Bed, ° F. | Top of Bed, ° F. | Freeboard Space, ° F. |
|---|---|---|---|
| 1 | 1,610 | 1,590 | 1,660 |
| 2 | 1,550 | 1,540 | 1,700 |

[(3) Oxygen requirements]

| Test Run No. | $O_2$, percent | Utilized, lb./hr | $O_2$/VS, lb./lb. | Excess Air, percent |
|---|---|---|---|---|
| 1 | 73 | 88 | 1.38 | 27 |
| 2 | 50 | 60 | 1.23 | 50 |

The "Combustion Temperatures" for test runs No. 1 and 2 tabulated above substantiate the feature that instantaneous heat transfer and homogeneous thermal conditions existed throughout the fluidized bed, so that the average temperature between the top and bottom strata of the bed was negligible, which favored complete and odorless combustion of the prepared moist sludge.

From a cold start, the walls of the combustion unit and the bed of sand itself were heated by means of propane gas fed to the burner until the bed reached about 1200° F. at which point the gas was shut off and the combustion operation maintained utilizing the heat value of the sludge solids to sustain their own combustion. Thus, with a sludge concentration of 32 to 34% total solids, an operating temperature was attained of about 1600° F. without preheating the combustion air.

The total pressure loss was about 2½ to 3½ inches Hg, that pressure differential including the pressure drops through the fluidized bed, through the piping for the spent combustion gases, and through the gas scrubbing unit at the end. The pressure loss through the bed amounted to about 1 inch $H_2O$ per inch of subsided sand.

SUMMARY

In view of the foregoing presentation, the operating condition of the fluidized bed may be defined as the condition of a mass of graded solids, such as sand, maintained in a turbulent state by upflowing combustion air or gases, with concurrent continuous combustion of the sludge particles turbulently distributed throughout the bed and in turn furnishing the combustion heat effective to sustain the heat storing—and heat radiating effects of the fluidized sand, whereby the combustion of the sludge particles is effected substantially instantaneously in the bed and is maintainable uniformly throughout the volume of the bed so that a temperature gradient does not exist between the different portions of the bed as long as an adequate upflow "space rate" of the gases and complete combustion of the dispersed sludge particles are ensured. In this way, permanent bed of mineral particles is provided acting as a heat reservoir, sand being a practical material since it possesses high heat storing—and heat radiating capability, having moreover considerable resistence to abrasion. From a subsided or rest condition of such particles the bed may be expanded by the upward flow therethrough of a regulated amount of hot fluidizing gas, or of combustion air supplied by a blower and distributed uniformly across the bed by the constriction plate. Accordingly, that heat reservoir is everpresent in the combustion operation of this invention and becomes available for quick or instantaneous restarting of the combustion unit following an interruption.

We claim:

1. The method of oxidizing the organic solids contained in waste sludges by combustion, which comprises in a combustion chamber providing a body of hot graded inert granular material having heat storing and heat radiating capability; supply to said body of granular material a continuous upward stream of combustion air for maintaining said material in a fluidized state while hot; simultaneously introducing waste sludge into the body of hot fluidized material in a locality above the bottom plane thereof, to effect combustion of the organic solids; controlling the rate of supply of said sludge to said combustion chamber and the rate of supply of combustion air relative to each other so as to maintain complete thermal oxidation of the organic sludge solids with the total of the air supply such as to provide a space rate of the resulting combustion gases in said chamber sufficient and not in excess of that required for maintaining said fluidized state; diverting a portion of the required total of combustion air and preheating said diverted portion by heat exchange with the combustion gases; and controlling the proportion of diverted combustion air relative to the organic solids concentration in the sludge and supplying said diverted portion together with the non-diverted portion of the combustion air to said fluidized bed for maintaining said complete oxidation at a predetermined temperature.

[2. The method according to claim 1, wherein all of said combustion air is preheated by heat exchange with the combustion gases, and auxiliary fuel is introduced into said bed when said solids concentration in the sludge is insufficient to maintain said self-sustained combustion at said temperature.]

3. The method according to claim 1, wherein the proportion of combustion air thus preheated is sufficient to establish and maintain a combustion temperature of substantially not less than 1200° F.

4. The method according to claim 1, wherein said organic solids concentration is in a range of about 23% to about 40%, and wherein at least a portion of the combustion air is preheated by heat exchange with the combustion gases, so that combustion temperatures from about 1200° F. to about 1600° F. are maintainable.

5. The method of oxidizing the organic solids contained in waste sludges by combustion, which comprises in a combustion chamber providing a body of hot graded inert granular material having heat storing and heat radiating capability; introducing into said body of granular material a continuous upward stream of combustion air for maintaining said material in a fluidized state while hot; simultaneously supplying waste sludge to the body of fluidized material in a locality above the bottom plane thereof; controlling the rate of supply of said sludge to said combustion chamber and the rate of supply of combustion air relative to each other as determined from excess oxygen content indications in the combustion gases to maintain complete thermal oxidation of the organic sludge solids with the total of air supply such as to produce space rates of the resulting combustion gases for maintaining the fluidized state of granular material in said chamber; diverting a portion of the required total of combustion air and preheating said diverted portion by heat exchange with the combustion gases; and controlling the proportion of diverted combustion air from indications of temperature in said body of fluidized material, and supplying said diverted portion together with the non-diverted portion of the combustion air to said fluidized bed for maintaining said complete oxidation at a predetermined temperature.

[6. The method according to claim 5, wherein, when all of the combustion air is diverted for preheating, auxiliary fuel is supplied to said body of fluidized material in accordance with said temperature indications.]

7. The method of disposal by combustion of high moisture waste having waste solids which contain as a major portion thereof combustible organic waste matter, the balance comprising ash material and inert solids entrapped in said high moisture waste, which method comprises providing in a combustion chamber a body of hot inert granular material having heat-storing and heat-radiating capability; continuously supplying into said body of hot inert material through a constriction plate a continuous upward stream of combustion air for maintaining said inert granular material in a fluidized state while hot, continuously supplying said high moisture waste into said body of hot fluidized material, at a total solids concentration of less than 50%; automatically controlling the rate of supply of said high moisture waste and the rate of supply of the combustion air relative to one another, which comprises utilizing indications of the oxygen content in the combustion gases for causing variations in at least one of said supplies of high moisture waste and of combustion air respectively, so that the quantity of excess air required for complete combustion of said waste is maintained at less than 50%; automatically maintaining the temperature in said body of inert fluidized material sufficiently high for attaining complete and odorless combustion of said organic matter in said combustion chamber at temperatures within a range from about 1200° F. to about 1800° F., stripping residual ash material along with inert waste solids from said body of inert fluidized material by said combustion gases, and which comprises automatically maintaining said sufficient temperature by utilizing indications of temperatures in said body of inert fluidized material for causing the addition of heat to said body when said temperature falls below a predetermined limit and continuing said addition at least until the temperature reaches said predetermined limit.

8. The method of disposal by combustion of high moisture waste having waste solids which contain as a major portion thereof combustible organic waste matter, the balance comprising ash material and inert solids entrapped in said high moisture waste, which method comprises providing in a combustion chamber a body of hot inert granular material having heat-storing and heat-radiating capability; continuously supplying into said body of hot inert material through a construction plate a continuous upward stream of combustion air for maintaining said inert granular material in a fluidized state while hot, continuously supplying said high moisture waste into said body of hot fluidized material, at a total solids concentrations of less than 50%; automatically controlling the rate of supply of said high moisture waste and the rate of supply of the combustion air relative to one another, which comprises utilizing indications of the oxygen content in the combustion gases for causing variations in at least one of said supplies of high moisture waste and of combustion air respectively, so that the quantity of excess air required for complete combustion of said waste is maintained at less than 50%; automatically maintaining the temperature in said body of inert fluidized material sufficiently high for attaining complete and odorless combustion of said organic matter in said combustion chamber at temperatures within a range from about 1200° F. to about 1800° F. and stripping residual ash material along with inert waste solids from said body of inert fluidized material by said combustion gases, and which comprises utilizing temperature deviations for causing the addition of the heat content of an auxiliary fuel to said body of inert fluidized material when the temperature therein falls below a predetermined limit, and continuing the supply of said fuel at least until the temperature again reaches said predetermined limit.

9. The method of disposal by combustion of high moisture waste having waste solids which contain as a major portion thereof combustible organic waste matter, the balance comprising ash material and inert solids entrapped in said high moisture waste, which method comprises providing in a combustion chamber a body of hot inert granular material having heat-storing and heat-radiating capability; continuously supplying into said body of hot inert material through a constriction plate a continuous upward stream of combustion air for maintaining said inert granular material in a fluidized state while hot, continuously supplying said high moisture waste into said body of hot fluidized material, at a total solids concentration of less than 50%; automatically controlling the rate of supply of said high moisture waste and the rate of supply of the combustion air relative to one another, which comprises utilizing indications of the oxygen content in the combustion gases for causing variations in at least one of said supplies of high moisture waste and of combustion air respectively, so that the quantity of excess air required for complete combustion of said waste is maintained at less than 50%; automatically maintaining the temperature in said body of inert fluidized material sufficiently high for attaining complete and odorless combustion of said organic matter in said combustion chamber at temperatures within a range from about 1200° F. to about 1800° F., stripping residual ash material along with inert waste solids from said body of inert fluidized material by said combustion gases, and which comprises preheating the combustion air by heat exchange with the combustion gases, and utilizing temperature deviations in said body of hot inert fluidized material for causing respective variations in the amount of heat transfer from the combustion gases to the combustion air, for maintaining the combustion temperature above a predetermined limit.

10. The method of disposal by combustion of high moisture waste having waste solids which contain as a major portion thereof combustible organic waste matter, the balance comprising ash material and inert solids entrapped in said high moisture waste, which method comprises providing in a combustion chamber a body of hot inert granular material having heat-storing and heat-radiating capability; continuously supplying into said body of hot inert material through a constriction plate a continuous upward stream of combustion air for maintaining said inert granular material in a fluidized state while hot, continuously supplying said high moisture waste into said body of hot fluidized material, at a total solids concentration of less than 50%; automatically controlling the rate of supply of said high moisture waste and the rate of supply of the combustion air relative to one another, which comprises utilizing indications of the oxygen content in the combustion gases for causing variations in at least one of said supplies of high moisture waste and of combustion air respectively, so that the quantity of excess air required for complete combustion of said waste is maintained at less than 50%; automatically maintaining the temperature in said body of inert fluidized material sufficiently high for attaining complete and odorless combustion of said organic matter in said combustion chamber at temperatures within a range from about 1200° F. to about 1800° F., and stripping residual ash material along with inert waste solids from said body of inert fluidized material by said combustion gases, and which comprises preheating the combustion air by heat exchange with the combustion gases, and utilizing temperature deviations in said body of inert fluidized material for causing respective variations in the amount of heat transfer from the combustion gases to the combustion air, to maintain the combustion temperature above a predetermined limit, and wherein the control of said temperature further comprises utilizing temperature deviations in said body of inert fluidized material for causing the addition of the heat content of an auxiliary fuel to said body of inert fluidized material when preheating of said combustion air is insufficient to maintain said temperature above said predetermined limit, and continuing the supply of said fuel at least until the temperature reaches again said predetermined limit.

11. Apparatus for the disposal of high moisture waste wherein the waste solids contain as a major portion hereof combustible organic waste matter, the balance comprising ash material and inert solids entrapped in said high moisture waste, which comprises a combustion unit for the combustion of said high moisture waste, having a transverse constriction plate dividing the unit into a windbox below and a combustion chamber above said plate, with a body of inert granular material having heat-storing and heat-radiating capability provided in said combustion chamber, first supply means for supplying said high moisture waste to said combustion chamber at a controllable rate, and adapted for delivering such high moisture waste at a total solids concentration of less than 50%; means including a second supply means leading to said windbox for providing air for fluidizing said granular material and for the combustion of said high moisture waste, for producing combustion gases and for stripping the ash material from the hot fluidized material by entrainment in said combustion gases; a first control means responsive to variations in the oxygen content in the combustion gases, comprising a combustion gas oxygen indicating device, a first relay means effective between and operatively interconnecting said oxygen indicating device and at least one of said controllable supply means for high moisture waste and for combustion air respectively, and adapted to receive impulses emanating from said oxygen indicating device in accordance with variations of the oxygen content in said gases, said first relay in turn effective to actuate said at least one controllable supply means in response to said variations in oxygen content, so as to maintain a predetermined oxygen excess in said combustion gases as well as complete combustion of said high moisture waste; and a second control means responsive to variations in the operating temperature in said body of inert fluidized material, for regulating said temperature so as to be sufficient to attain complete and odorless combustion of said organic waste matter, comprising heat control means operable for effecting the addition of heat to said fluidized material, temperature indicating means operatively connected to said combustion unit, and a second relay station effective between and operatively interconnecting said temperature indicating means and said heat control means, and adapted to receive impulses from said temperature indicating means when said operating temperature falls below a predetermined limit, said second relay station in turn adapted to actuate said heat control means to effect said addition of heat at least until the temperature again reaches said predetermined limit.

12. The apparatus according to claim 11, wherein said heat control means comprise a supply of an auxiliary fuel, provided with controllable means actuated by said second relay means for adding the heat content of said fuel to said body of inert fluidized material.

13. The apparatus according to claim 11, wherein said heat control means comprise an air preheater constructed and arranged for preheating of the combustion air by heat exchange with the combustion gases, regulating means operable for controlling the quantity of heat transferred in said preheater to said combustion air, and actuated by said second relay means, and wherein said heat control means further comprise a supply of an auxiliary fuel, provided with controllable means actuated from said second relay means when said quantity of heat transferred in said preheater is insufficient for maintaining said sufficient operating temperature, for adding the heat content of said fuel to said body of inert fluidized material until said sufficient operating temperature is re-established.

14. The method of disposal of sewage sludge, which comprises mechanically continuously dewatering the sewage sludge to provide a wet cake material having a total waste solids concentration of less than 50% but not less than about 20%, said solids comprising over 50% organic waste matter, the balance comprising ash material and entrapped inert solids, providing in a combustion chamber a body of hot inert granular material having heat-storing and heat-radiating capability; continuously supplying into said body of hot inert material through a constriction plate a continuous upward stream of combustion air for maintaining said inert granular material in a fluidized state while hot and for effecting the combustion of said organic waste matter; continuously supplying said wet cake material at said total waste solids concentration into said body of hot fluidized material while supplying said combustion air at such a rate and supplying said wet cake material at such a rate in relation to each other as to maintain less than 50% excess air in the resulting combustion gases, maintaining the temperature of said body of hot inert fluidized material sufficiently high for attaining complete and odorless combustion of said organic matter in said combustion chamber at temperatures from about 1200° F. to about 1800° F. producing inert combustion gases, ash material, and steam, with said organic solids providing, during normal operation, substantially all the fuel for effecting said combustion and producing said steam.

*15. The method of oxidizing the organic solids contained in waste sludges by combustion, which comprises in a combustion chamber providing a body of hot graded inert granular material having heat storing and heat radiating capability; supplying to said body of granular material a continuous upward stream of combustion air for maintaining said material in a fluidized state while hot; simultaneously introducing waste sludge into the body of hot fluidized material in a locality above the bottom plane thereof, to effect combustion of the organic solids; controlling the rate of supply of said sludge to said combustion chamber and the rate of supply of combustion air relative to each other so as to maintain complete thermal oxidation of the organic sludge solids with the total of the air supply such as to provide a space rate of the resulting combustion gases in said chamber sufficient and not in excess of that required for maintaining said fluidized state; diverting said total supply of combustion air for preheating; preheating the diverted air by heat exchange with the combustion gases, supplying said preheated air to said fluidized bed for maintaining said complete oxidization at a predetermined temperature, and introducing auxiliary fuel into said bed when said solids concentration in the sludge is insufficient to maintain self-sustained combustion.*

*16. The method of oxidizing the organic solids contained in waste sludges by combustion, which comprises in a combustion chamber providing a body of hot graded inert granular material having heat storing and heat radiating capability; introducing into said body of granular material a continuous upward stream of combustion air for maintaining said material in a fluidized state while hot; simultaneously supplying waste sludge to the body of fluidized material in a locality above the bottom plane thereof; controlling the rate of supply of said sludge to said combustion chamber and the rate of supply of combustion air relative to each other as determined from excess oxygen content indications in the combustion gases to maintain complete thermal oxidation of the organic sludge solids with the total of air supply such as to produce space rates of the resulting combustion gases for maintaining the fluidized state of the granular material in said chamber; diverting said total supply of combustion air for preheating and preheating said diverted air by heat exchange with the combustion gases, supplying said preheated air to said fluidized bed for maintaining said complete oxidation at a predetermined temperature, and supplying auxiliary fuel into the bed in accordance with temperature indications when said preheating insufficient to maintain said predetermined temperature.*

*17. The method of oxidizing the organic solids contained in sewage sludges by combustion, which comprises in a combustion chamber providing a body of hot graded tained in sewage sludges by comustion, which comprises diating capability; supplying to said body of granular material a continuous upward stream of combustion air for maintaining said material in a fluidized state while hot; dewatering said sewage sludge to a solids content between 23 and 40%, simultaneously introducing the dewatered sewage sludge into the body of hot fluidized material in a locality above the bottom plane thereof, to effect combustion of the organic solids; controlling the rate of supply of said sludge to said combustion chamber and the rate of supply of combustion air relative to each other so as to maintain complete thermal oxidation of the organic slude solids with the total of the air supply such as to provide a space rate of the resulting combustion gases in said chamber sufficient and not in excess of that required for maintaining said fluidized state and carrying away ash material; diverting said total supply of combustion air for preheating, preheating the diverted air by heat exchange with the combustion gases, supplying said preheated air to said fluidized bed for maintaining said complete oxidization at a predetermined temperature between 1200 and 1800° Fahrenheit, and introducing auxiliary fuel into said bed when said solids concentration in the sludge is insufficient to maintain self-sustained combustion at said temperature.*

*18. The method of oxidizing the organic solids contained in sewage sludges by combustion, which comprises in a combustion chamber providing a body of hot graded inert granular material having heat storing and heat radiating capability; introducing into said body of granular material a continuous upward stream of combustion air for maintaining said material in a fluidized state while hot; dewatering said sewage sludge to a solids content between 23 and 40%, simultaneously supplying the dewatered sewage sludge to the body of fluidized material in a locality above the bottom plane thereof; controlling the rate of supply of said sludge to said combustion chamber and the rate of supply of combustion air relative to each other as determined from excess oxygen content indications in the combustion gases to maintain complete thermal oxidization of the organic sludge solids with the total of air supply such as to produce space rates of the resulting combustion gases for maintaining the fluidized state of the granular material in said chamber and carrying away ash material, diverting said total supply of combustion air for preheating, preheating said combustion air by heat exchange with combustion gases, supplying said preheated combustion air to said fluidized bed for maintaining said complete oxidization at a predetermined temperature between 1200 and 1800° Fahrenheit, and introducing auxiliary fuel into said bed when the organic solids concentration in the sludge is insufficient to maintain self-sustained combustion.*

*19. The method of disposal of sewage sludge, which comprises, heating the sludge to condition it for more complete mechanical dewatering, thereafter continuously mechanically dewatering the heated sludge, to provide a wet cake material having a total waste solids concentration of not less than about 20%, said solids comprising over 50% organic waste matter, the balance comprising ash material and entrapped inert solids, providing in a combustion chamber a body of hot inert granular material having heat-storing and heat-radiating capability; continuously supplying into said body of hot inert material through a constriction plate a continuous upward*

*stream of combustion air for maintaining said inert granular material in a fluidized state while hot and for effecting the combustion of said organic waste matter; continuously supplying said dewatered sludge into said body of hot fluidized material while supplying said combustion air at such a rate and supplying said wet cake material at such a rate in relation to each other as to maintain less than 50% excess air in the resulting combustion gases, said fluidized body disintegrating and dispersing the dewatered sewage sludge cake within the body and drying and effecting combustion thereof, stripping the ash material resulting from said combustion from said body, by the combustion gases, maintaining the temperature of said body of hot inert fluidized material sufficiently high for attaining complete and odorless combustion of said organic matter in said combustion chamber at temperatures from about 1200° F. to about 1800° F., thereby producing inert combustion gases, ash material, and steam.*

*20. The method defined in claim 19 in which said organic solids provide, during normal operation, substantially all the fuel for effecting said combustion and producing said steam.*

*21. The method defined in claim 20 in which a heat exchanger is provided in heat exchange relation to said sludge prior to mechanical dewatering, and heat is supplied to said heat exchanger by the combustion gases from said body.*

References Cited

The following references, cited by the Examiner, are of record in the patented file of this patent or the original patent.

UNITED STATES PATENTS

| | | | |
|---|---|---|---|
| 713,238 | 11/1902 | Padgett | 110—56 |
| 617,014 | 2/1927 | Derleth | 110—8 |
| 1,892,681 | 1/1933 | Rankin | 110—8 |
| 1,986,332 | 1/1935 | Fisher | 210—10 X |
| 2,171,535 | 9/1939 | Berg et al. | 110—8 |
| 2,246,224 | 6/1941 | Streander. | |
| 2,607,666 | 8/1952 | Martin | 263—21 X |
| 2,638,684 | 5/1953 | Jukkola | 110—28 |
| 2,648,950 | 8/1953 | Miller | 110—7 X |
| 2,650,084 | 8/1953 | White | 263—21 X |
| 2,655,883 | 10/1953 | Martin | 110—8 |
| 2,678,615 | 5/1954 | Soderlund et al. | 110—7 |
| 2,734,037 | 2/1956 | Mannbro. | |
| 2,774,661 | 12/1956 | White | 263—21 X |
| 2,976,853 | 3/1961 | Hunter et al. | 110—28 |
| 3,022,989 | 2/1962 | Pyzel | 263—21 X |
| 3,049,300 | 8/1962 | Lewis et al. | 236—15 |
| 3,060,118 | 10/1962 | Schoeffel | 210—63 X |
| 1,687,118 | 10/1928 | Winkler. | |
| 2,530,651 | 11/1950 | Christensen. | |
| 2,774,661 | 12/1956 | White. | |

FOREIGN PATENTS

| | | |
|---|---|---|
| 484,743 | 10/1929 | Germany. |
| 593,180 | 10/1947 | Great Britain. |

OTHER REFERENCES

Principles of Sugar Technology, Honig; published by Elseuier Publishing Company, New York.

JAMES W. WESTHAVER, *Primary Examiner.*